(12) United States Patent
Nicholas et al.

(10) Patent No.: US 12,476,299 B2
(45) Date of Patent: Nov. 18, 2025

(54) TAB COOLING FOR BATTERIES

(71) Applicant: Qdot Technology Ltd, Didcot (GB)

(72) Inventors: Jack Nicholas, Didcot (GB); Tsun Holt Wong, Didcot (GB); Zachary Jackson, Didcot (GB); João Vieira, Didcot (GB); Daniel Fahy, Didcot (GB); Alasdair Morrison, Didcot (GB)

(73) Assignee: Qdot Technology Ltd, Didcot (GB)

( * ) Notice: Subject to any disclaimer, the term of this patent is extended or adjusted under 35 U.S.C. 154(b) by 504 days.

(21) Appl. No.: 17/998,604

(22) PCT Filed: May 11, 2021

(86) PCT No.: PCT/GB2021/051128
§ 371 (c)(1),
(2) Date: Nov. 11, 2022

(87) PCT Pub. No.: WO2021/229214
PCT Pub. Date: Nov. 18, 2021

(65) Prior Publication Data
US 2023/0231221 A1    Jul. 20, 2023

(30) Foreign Application Priority Data

May 11, 2020 (GB) ..................... 2006918

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/6568* (2015.04);
(Continued)

(58) Field of Classification Search
None
See application file for complete search history.

(56) References Cited

U.S. PATENT DOCUMENTS 7,547,487 B1 * 6/2009 Smith ................. H01M 50/553
429/57
9,553,343 B2    1/2017 Malcom et al.
(Continued)

FOREIGN PATENT DOCUMENTS

CN        110676403 A      1/2020
DE     102017212258 A1    1/2019
(Continued)

OTHER PUBLICATIONS

International Search Report and Written Opinion, International Application No. PCT/GB2021/051128, dated Sep. 7, 2021.
(Continued)

*Primary Examiner* — Carlos Barcena
(74) *Attorney, Agent, or Firm* — MARSHALL, GERSTEIN & BORUN LLP

(57) ABSTRACT

An integrated battery and cooling system (2) is provided, comprising a plurality of cells (10) and a heat sink arrangement (16). Each cell (10) comprises at least one electrical collector (27) of a first material coupled to a first electrically and thermally conductive electrical terminal (12) extending away therefrom, and at least one electrical collector (27) of a second material coupled to a second electrically and thermally conductive electrical terminal (14) extending away therefrom. The electrical terminals (12, 14) are substantially planar and form respective sidewalls of a series of elongate channels there-between. The heat sink arrangement (16) extends within each channel and is thermally coupled to at least one sidewall thereof.

24 Claims, 17 Drawing Sheets

(51) Int. Cl.
     *H01M 10/6568*     (2014.01)
     *H01M 50/211*      (2021.01)
     *H01M 50/289*      (2021.01)
     *H01M 50/51*       (2021.01)
     *H01M 50/553*      (2021.01)

(52) U.S. Cl.
     CPC ....... *H01M 50/211* (2021.01); *H01M 50/289* (2021.01); *H01M 50/51* (2021.01); *H01M 50/553* (2021.01)

(56) References Cited

U.S. PATENT DOCUMENTS

| | | |
|---|---|---|
| 2011/0189526 A1 | 8/2011 | Michelitsch et al. |
| 2017/0040653 A1 | 2/2017 | Morris et al. |
| 2019/0148799 A1* | 5/2019 | Lim .................... H01M 10/613 429/120 |
| 2019/0379093 A1* | 12/2019 | Choi .................. H01M 50/507 |

FOREIGN PATENT DOCUMENTS

| | | |
|---|---|---|
| EP | 2405527 A1 | 1/2012 |
| EP | 2226870 B1 | 3/2012 |
| GB | 2068633 A | 8/1981 |

OTHER PUBLICATIONS

Office Action, Chinese Patent Application No. 202180034431.8, date May 30, 2025.

\* cited by examiner

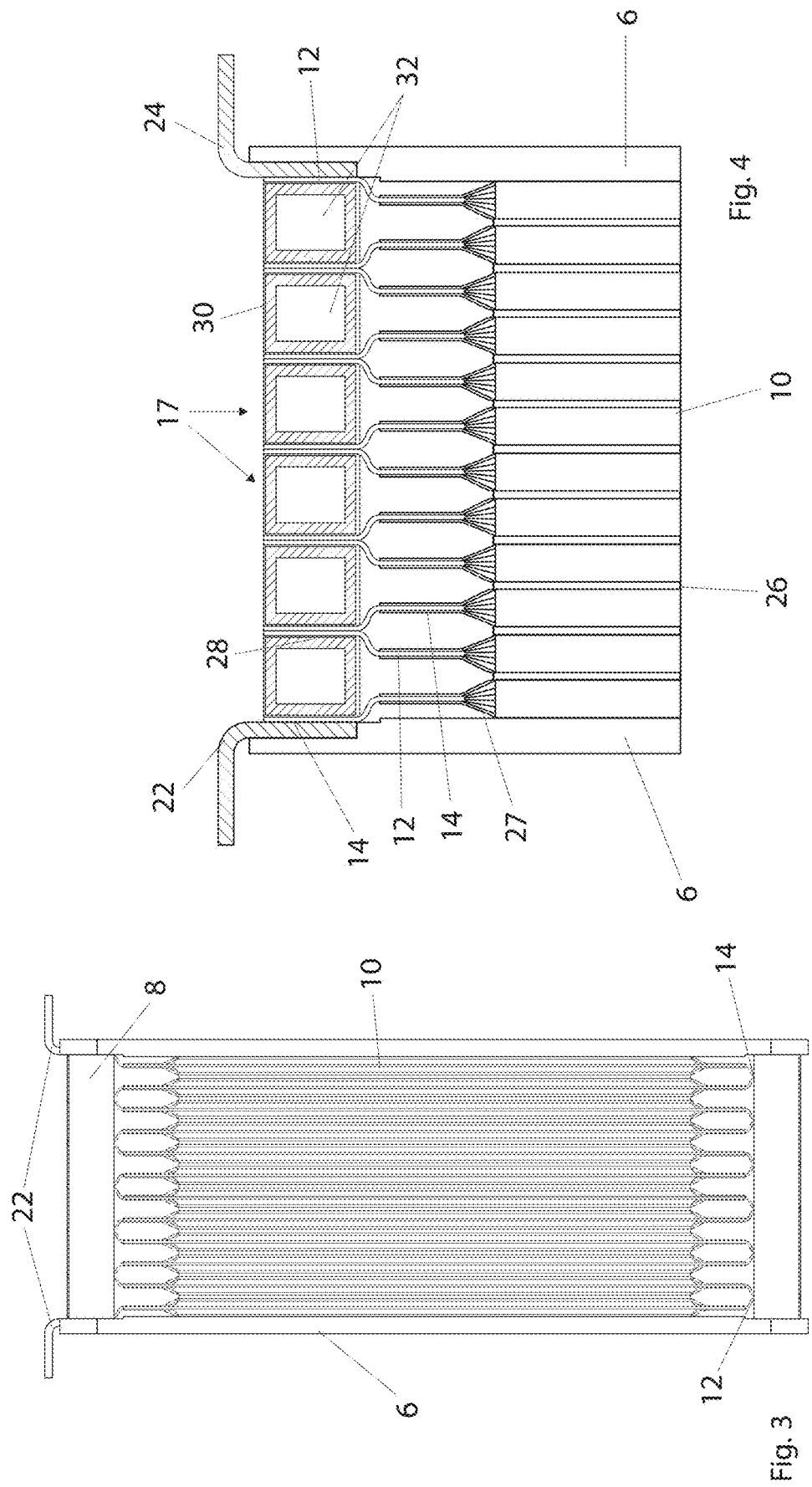

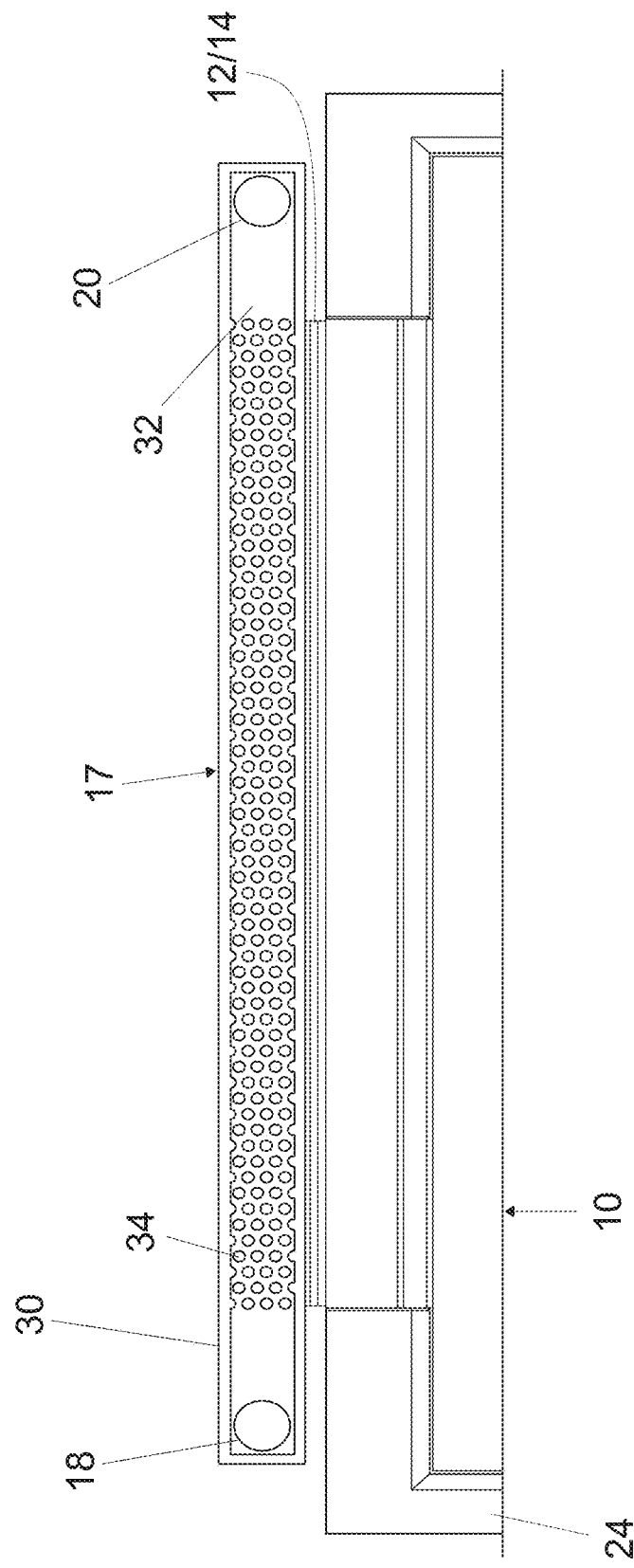

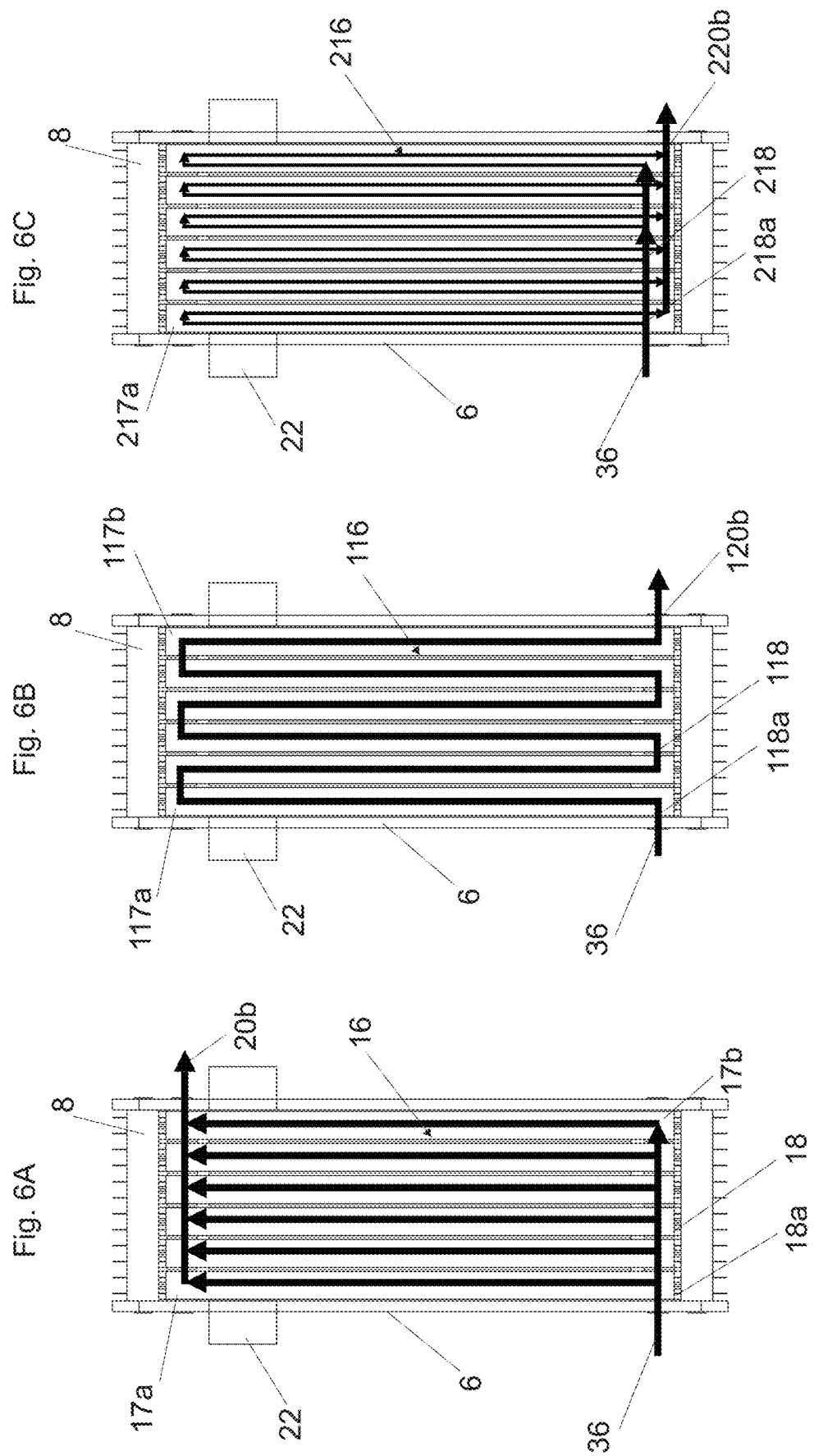

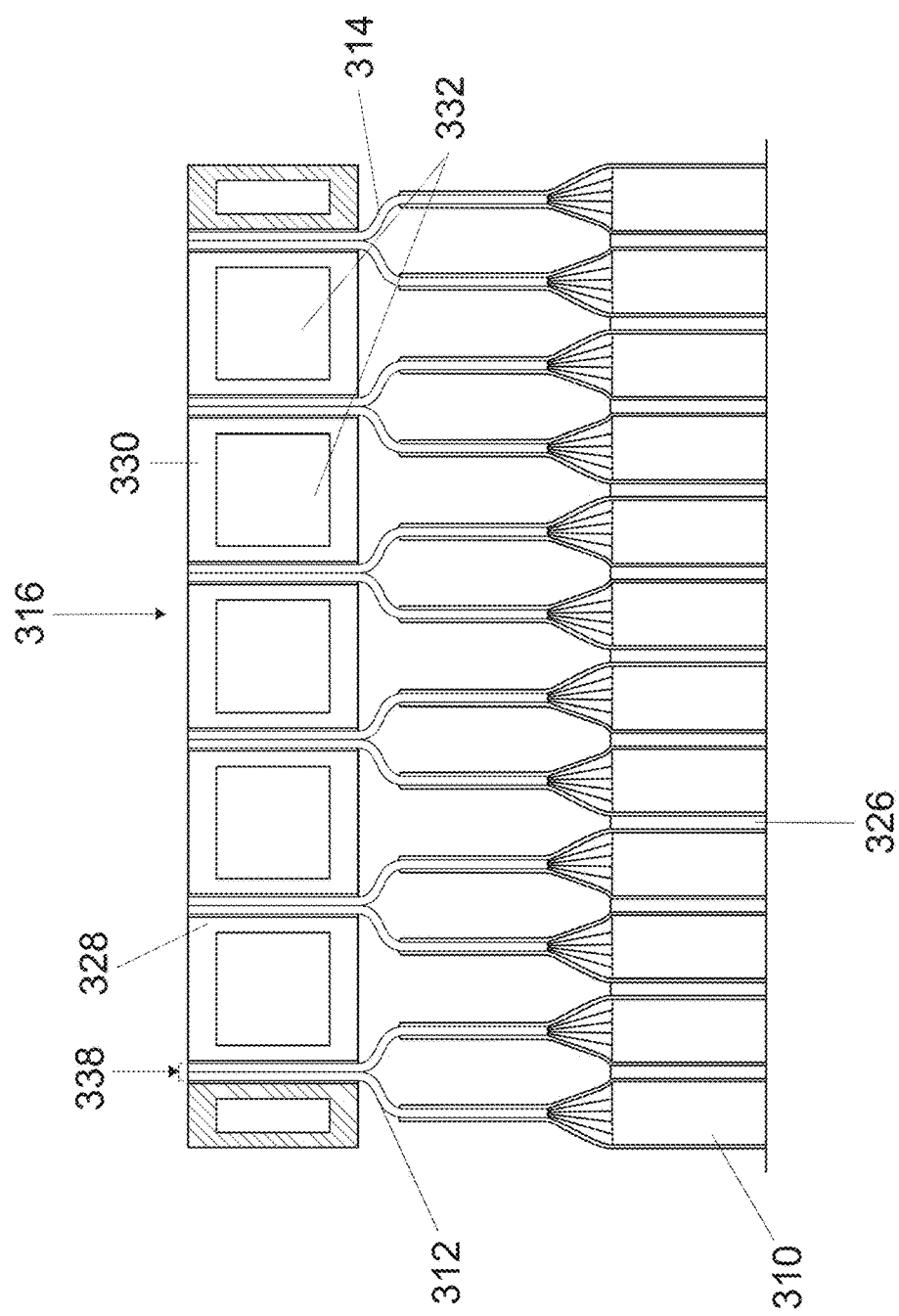

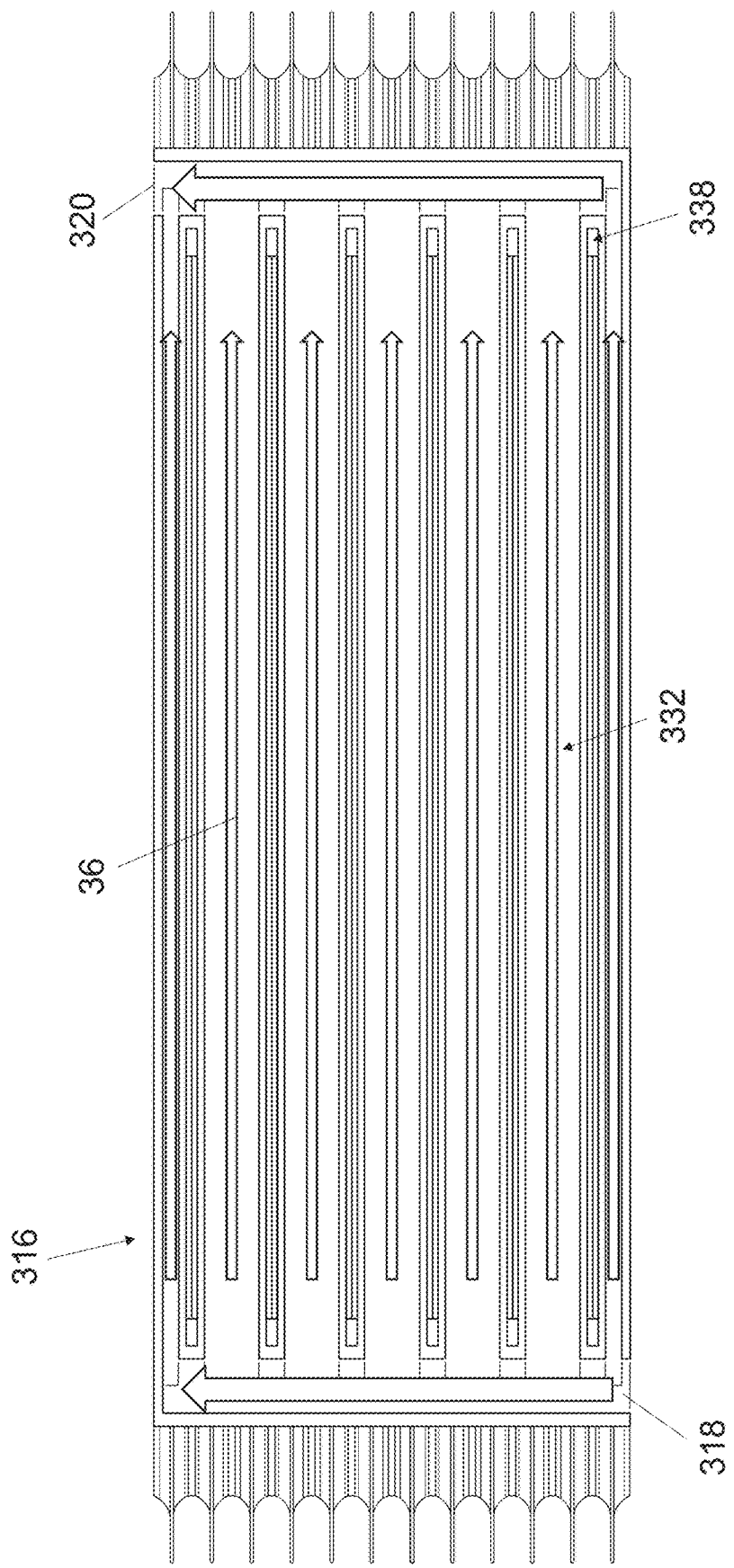

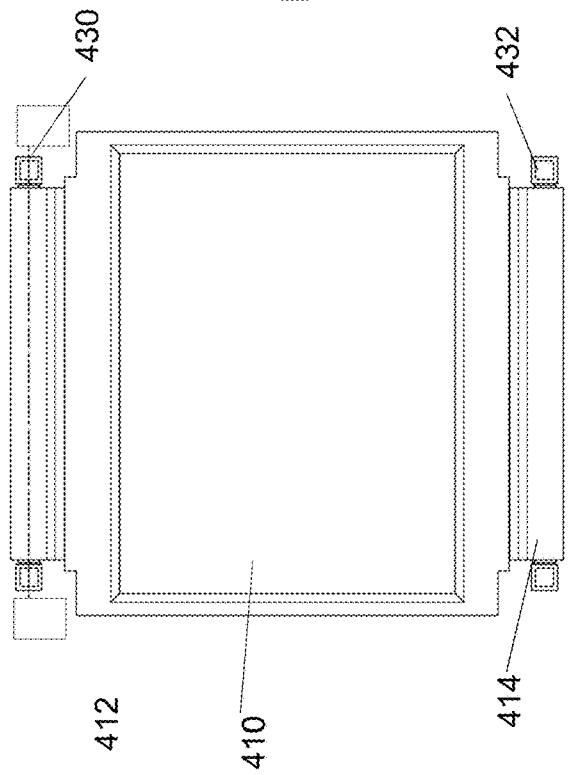
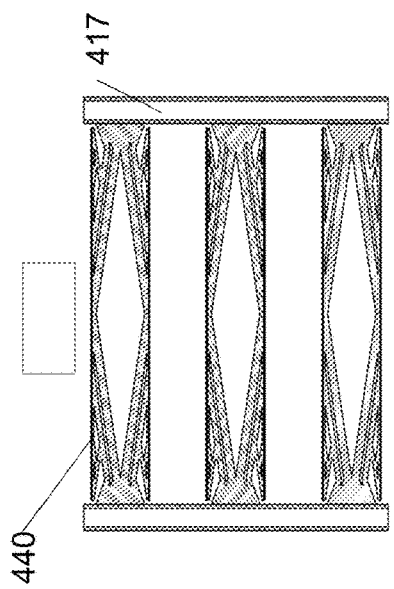
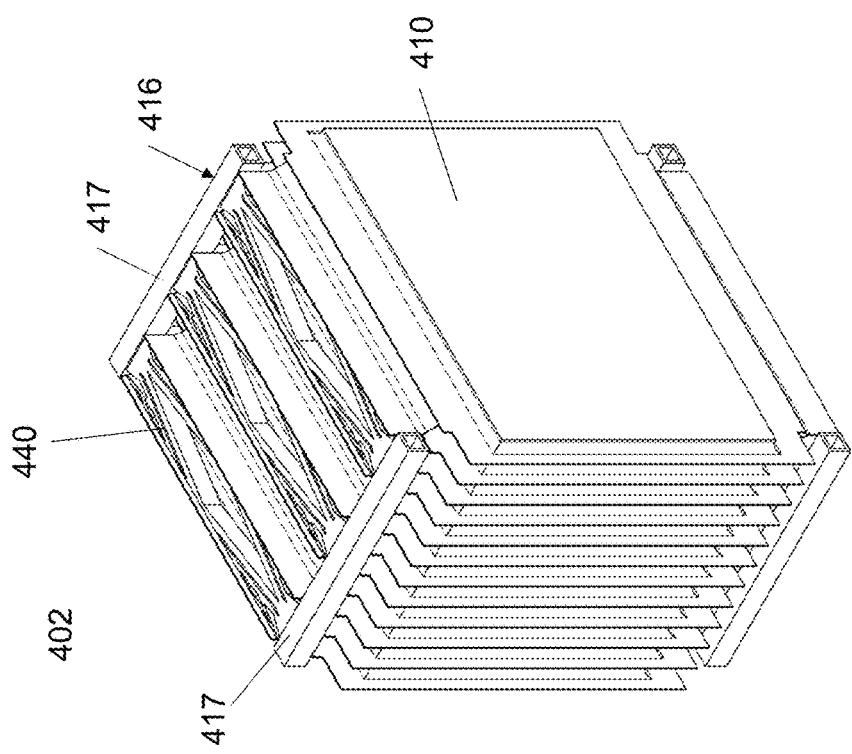
Fig. 10B
Fig. 10C
Fig. 10A

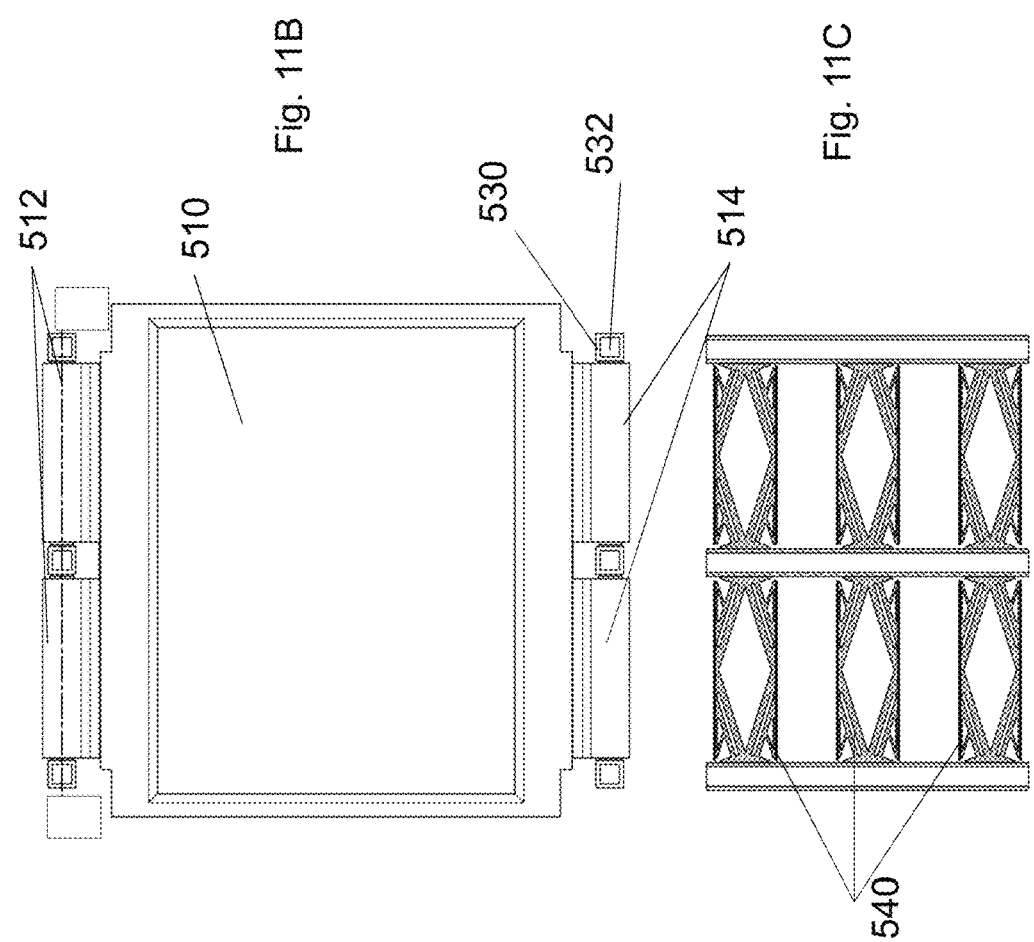
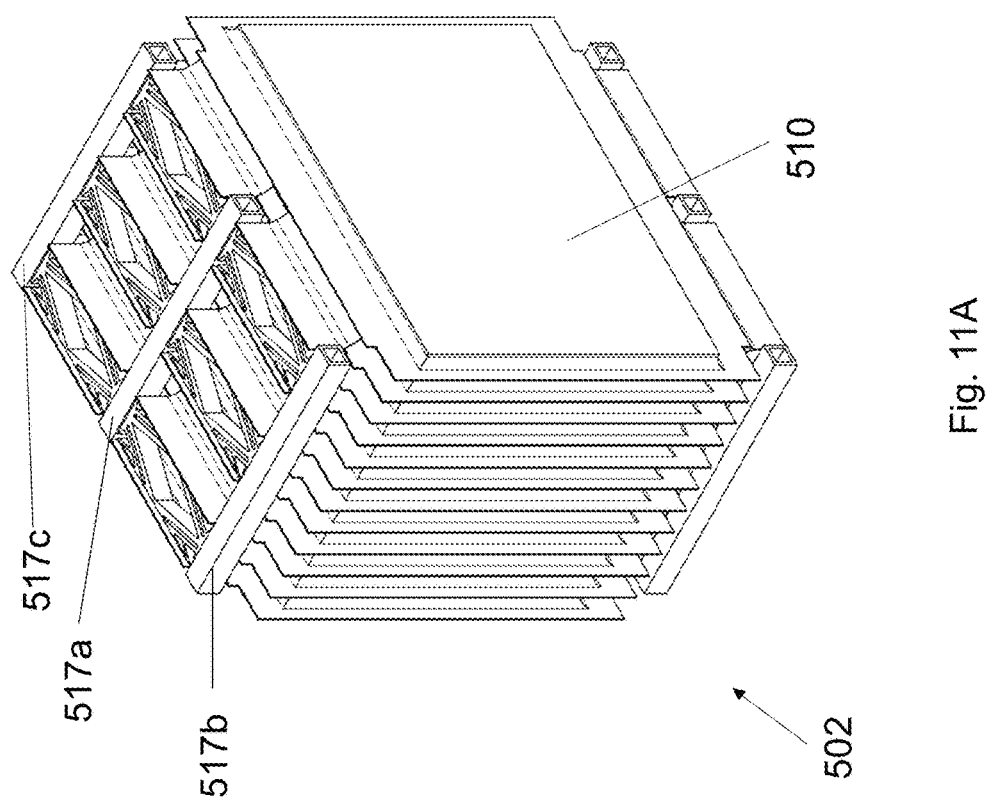

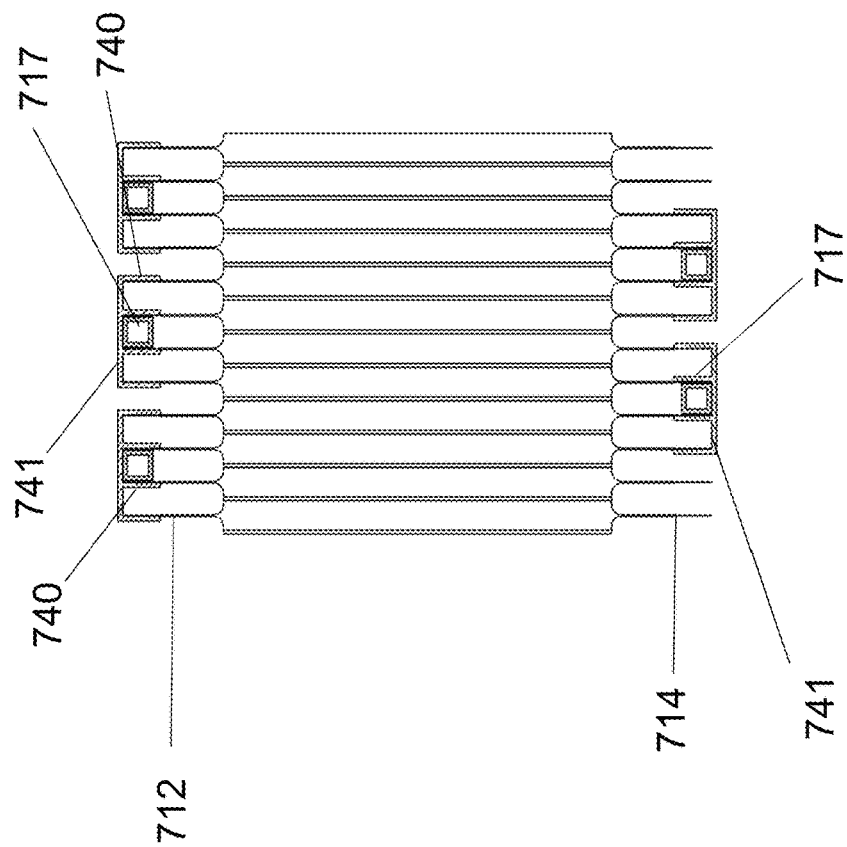
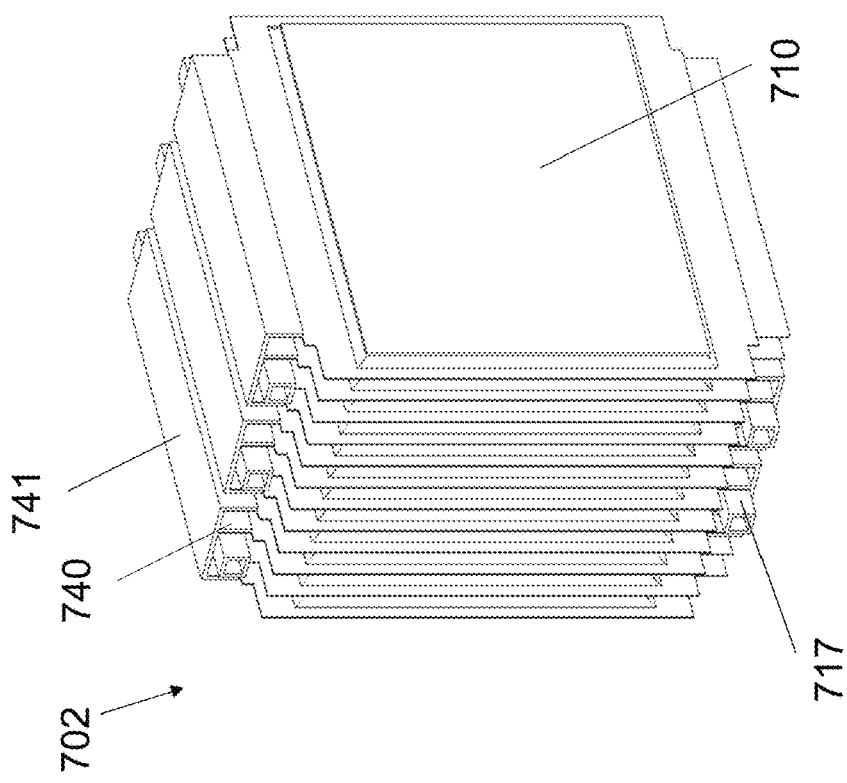
Fig. 13B
Fig. 13A

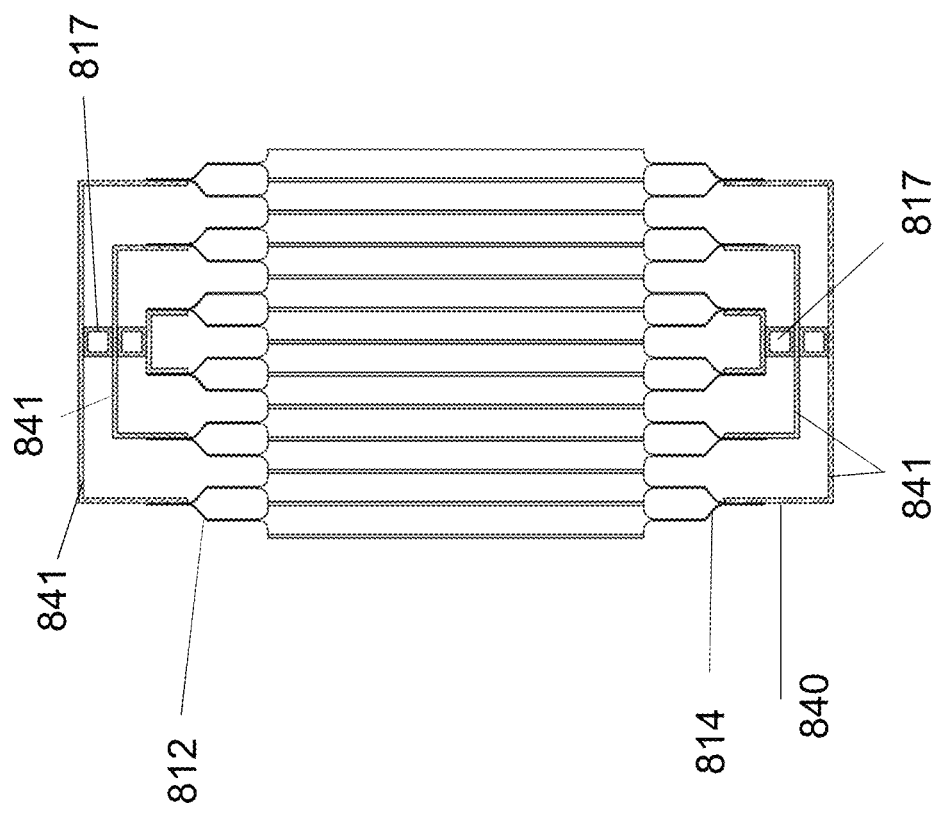
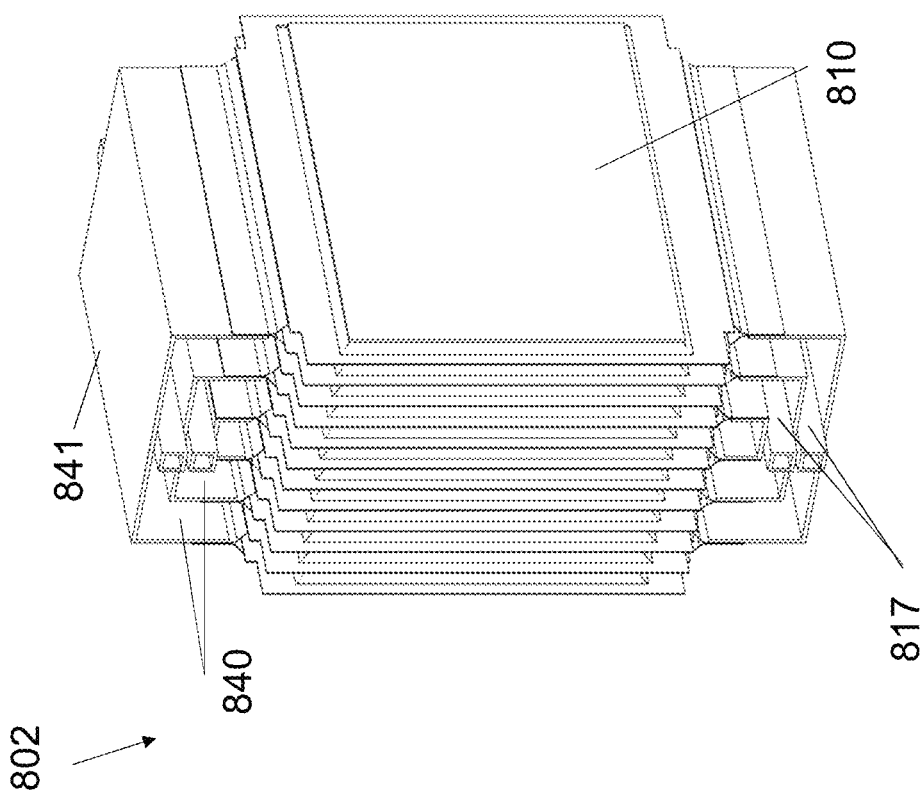
Fig. 14B
Fig. 14A

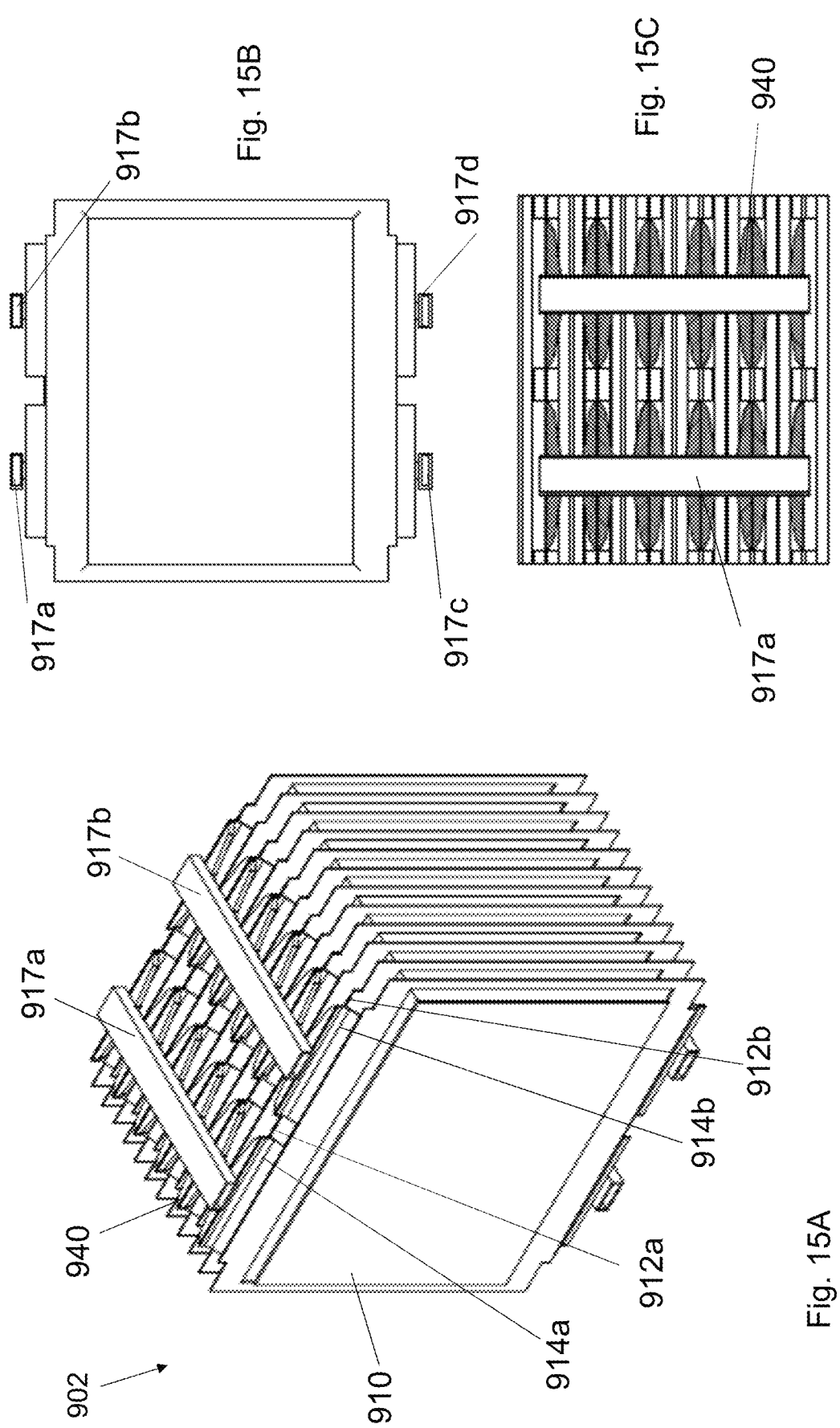

TAB COOLING FOR BATTERIES

BACKGROUND

This invention relates to the cooling of batteries, for example batteries used to power electric vehicles (EVs) but they could also be used in other applications. EVs and other forms of electric transport are becoming increasingly popular due to concerns over the environmental impacts of traditional fossil fuel powered engines, and the reduced environmental impact of EVs in comparison. However, one major issue facing the increased usage of EVs is the limitations in their performance based on the limitations of the batteries used.

One example of a concern regarding the batteries used in EVs is their lifetime. The charging and discharging of the batteries causes heating which in turn reduces their lifetime through thermal degradation of the battery. The maximum operating temperature of the batteries can be less than the ambient air temperature in which case cooling is further required for optimal battery performance and lifetime. Cooling additionally provides safety improvements through the prevention of overheating which could lead to fire or power failure. Improvements in cooling of batteries is therefore desirable in order to increase EV performance and safety.

Pouch cells are commonly used for batteries in EVs. Pouch cells have a housing within which are a plurality of sub-cells, each composed of a negative electrical collector, an anode and cathode, separated by an ion-permeable electrode separation layer, and a positive electrical collector. An electrolyte surrounds the layers of the sub-cell. These sub-cells are layered to form a cell, with the multiple layers of electrical collectors coupled to electrically and thermally conductive electrical terminals, commonly described as tabs, which extend beyond the cell housing. Current methods of battery cooling in EVs rely on the interface between the layers of cells being cooled as this provides the largest surface area over which to cool. The Applicant has appreciated there are shortcomings associated with this method of cooling, in particular the temperature gradient this causes across the depth of the battery due to the poor thermal conductivity through the multiple layers within the sub cells and particularly the typically high contact resistance between respective layers, leading to the hottest part of the battery (the centre) dictating the lifetime of the battery as a whole.

SUMMARY

When viewed from a first aspect, the present invention provides an integrated battery and cooling system comprising a plurality of cells and a heat sink arrangement, wherein each cell comprises at least one electrical collector of a first material coupled to a first electrically and thermally conductive electrical terminal extending away therefrom, and at least one electrical collector of a second material coupled to a second electrically and thermally conductive electrical terminal extending away therefrom, wherein the electrical terminals are substantially planar and form respective sidewalls of a series of elongate channels therebetween, and wherein the heat sink arrangement extends within each channel and is thermally coupled to at least one sidewall thereof.

Thus it will be seen by those skilled in the art that in accordance with the invention, the cooling of the batteries can now occur by cooling the thermally conductive electrical terminals and thereby the electrical collectors which extend throughout the length of the battery since both are thermally coupled to the heat sink arrangement. This addresses one of the shortcomings of the prior art interface cooling methods identified by the Applicant in that cooling on just the external face of the pouch cells leads to thermal gradients which are perpendicular to the layers within the cell, leading to fast degradation of the centre of the cell where the temperature is highest and the interface cooling is least effective. This means the cells undergo non-uniform ageing due to the sub-cells experiencing differing levels of degradation. The performance of the cell is limited by the performance of the weakest sub-cell. Furthermore, each internal layer is at a different temperature which causes each electrode layer to exhibit varying discharge behaviour. Tab cooling in accordance with the invention however can ensure that the cooling occurs in-plane within each cell. This may improve the homogeneity of the discharging behaviour of the battery due to the improved homogeneity of the temperature across each cell, therefore extending the lifetime of the battery over multiple charge-discharge cycles.

A further advantage of tab cooling in this way is that there is no longer a requirement for large gaps between the faces of cells where the face cooling apparatus would be. The cells can therefore be packed closer together which improves the packing efficiency. The ability to have more cells packed into a given volume is advantageous in many applications. Typically the gap between adjacent electrical terminals when pouch cells are stacked next to one another with no cooling apparatus between is ~5 mm. This gap is large enough that the tab cooling system provided by the heat sink arrangement which extends between the electrical terminals can cool effectively. The heat sink arrangement does not need to extend the full width of the elongate channels. For example it may be coupled to one sidewall of the channel, but separated by a gap from the other sidewall.

Tab cooling also reduces the constraints on cell thickness. With prior art interface cooling methods, the thickness of the cell is limited due to the temperature gradient across the depth of the cell. Increasing the thickness of the cell when interface cooling is used would correspondingly increase the maximum temperature in the centre of the cell where there would be minimal cooling due to the difficulty of heat conduction through multiple layers and interfaces within the cell. By contrast, tab cooling allows for thicker cells or two or more cells connected in parallel where the tabs are coupled to each other and to the same heat sink due to the increased homogeneity of the temperature throughout the cell. Although the thermal conduction length is longer in tab cooling, as heat must be conducted along the width, as opposed to the depth of the cell, overall cooling is still typically improved. This is because there is better thermal conductivity along the width of the cell where the electrical collectors can conduct heat, as opposed to the depth where the multiple layers and interfaces introduce thermal resistance.

In addition to the general advantages set out above which can be realised with tab cooling, the specific arrangements provided in accordance with the present invention may provide further advantages. More specifically, providing the heat sink in the channels which are formed advantageously provides a significant contact area and so improves the degree of thermal contact. Having the planar terminals can simplify manufacturing this arrangement and may further help to make the cell more compact.

The degree of cooling required to cool the cells will depend on the purpose of the cells, as well as the external environment. An external processor may be provided to determine the optimum temperature at which the cells should operate to optimise their function. The cooling may be achieved using a feedback control system which will measure the temperature of the cells and use this to determine the degree of cooling required. The temperature of the cells may be continually monitored such that the system can respond to varying circumstances.

In a set of embodiments, the heat sink arrangement comprises a plurality of bars disposed in the respective channels. The bars could be solid but in a set of embodiments each bar comprises an outer casing housing an internal coolant fluid which in use flows into the bar via an inlet and out of the bar via an outlet. The outer casing may be electrically and thermally conductive, and the coolant fluid may be either a liquid or gas. The coolant fluid may be electrically conductive, it may also be electrically insulating or a dielectric. In a set of embodiments the plurality of bars are arranged such that each bar extends across the width of the corresponding elongate channel and is thermally coupled to both sidewalls—i.e. to the two adjacent electrical terminals. In a set of embodiments each bar is connected to an adjacent bar via their respective inlets and outlets to enable the flow of coolant fluid throughout the plurality of bars.

In another set of embodiments, the heat sink arrangement comprises a block including slots receiving the electrical terminals, such that the block heat sink arrangement extends within the elongate channels between the electrical terminals. Again the block could be solid apart from the slots but in a set of embodiments it comprises an outer casing housing an internal coolant fluid which in use flows into the block via an inlet and out of the block via an outlet.

A block heat sink arrangement may have benefits over the plurality of bars in that as the block heat sink arrangement has fewer parts, there are fewer potential leak points for the internal coolant fluid. A further advantage of this system may be that the block heat sink arrangement can surround the electrical terminals on all sides, forming a larger contact surface area between the electrical terminals and the heat sink arrangement, further improving the efficiency of the cooling. The electrical terminals may be fitted into the slots in the block heat sink arrangement using methods such as thermal shrink fitting, flexible pads, pressure fitting etc. The electrical terminals may also extend beyond the slots of the heatsink arrangement. This may be for manufacturing reasons or to enable a further connection, for example to a sensor.

Where the heat sink arrangement is solid throughout, it may be constructed from an electrically and thermally conductive material such as copper or aluminium.

In a set of embodiments as well as extending between the terminals in the channels therebetween, the heat sink arrangement also extends over the ends of the electrical terminals. For example where the electrical terminals are received in respective slots, such slots would extend only part way through the thickness of the heat sink arrangement.

In a set of embodiments, the heat sink arrangement comprises cooling features within the outer casing disposed in a flow channel in which the coolant fluid can flow. These cooling features may be pedestals, ribs, pins, fins, impingement etc. The cooling features may increase the surface area in contact with the coolant fluid, as well as modifying the flow of the coolant fluid through the heat sink arrangement e.g. to increase turbulence, improving the heat transfer between the outer casing of the heat sink arrangement and the coolant fluid flowing therethrough.

The coolant fluid may be arranged to flow through the heat sink arrangement in a variety of configurations. The coolant fluid may be pumped using an external heat transfer system which expels waste heat from the coolant fluid as well as maintaining the flow of the coolant fluid through the heat sink arrangement. One possible configuration of the coolant fluid flow is a parallel configuration where the coolant fluid is distributed between the heat sink arrangement within the elongate channels. The coolant fluid may then flow through each channel/bar at the same time, be collected and flow out of the heat sink arrangement to the external heat transfer system. Another possible coolant flow configurations is a series configuration where the coolant fluid flows through each channel/bar in turn. This configuration may keep the temperature gradient within an individual cell small, even if the cells themselves operate at slightly different temperatures. In addition, a series coolant flow configuration may require less coolant mass flow than a parallel configuration.

In a set of embodiments, an external support structure encases the integrated battery and cooling system. This may comprise two end plates which enclose the cells and heat sink arrangement, and are connected via rigid support rods. The cells which form the battery may need to be held under compression in order that they remain planar. The external support structure may therefore provide lateral compression to the plurality of cells such that they do not delaminate. The external support structure may also clamp the plurality of cells to provide support.

In a set of embodiments, a compressible layer is provided between adjacent cells. In a set of embodiments, a compressible layer is provided between the outermost cells and the external support structure. When cells are charged or discharged they expand, therefore the compressible layer may enable a small amount of expansion of the cells during charge and discharge. This compressible material may be a foam.

In a set of embodiments, adjacent pairs of electrical terminals are electrically coupled to connect the plurality of cells in series. This may be achieved by the electrical terminals being shaped so that they are bent in a proximal region such that they come into electrical and thermal contact with the adjacent electrical terminal and straight in a distal region such that pairs of electrical terminals form the sidewalls of the elongate channels which contain the heat sink arrangement. Connecting multiple cells in series allows for a higher total voltage to be derived from a battery. The maximum total voltage which a single cell can produce is typically ~4V. Through connecting multiple cells in series, the total voltage of the battery is increased, up to that which is necessary for powering of EVs. Cells may also be electrically connected in parallel to increase capacity without increasing the total voltage. The total voltage across the battery may be obtained using external electrical connections which are electrically coupled to the outermost electrical terminals of the plurality of cells. These external electrical connections may extend beyond the heat sink arrangement and support structure to enable the battery to provide external power.

In a set of embodiments, an electrically insulating, thermally conductive layer is provided between the electrical terminals and the heat sink arrangement. This may prevent short circuiting of the battery if the outer casing of the heat sink arrangement or the internal coolant fluid is also electrically conductive.

The cell could be of any convenient shape and type but in a set of embodiments the cell is a rectangular pouch cell, with two long and two short edges. The pouch cell may have a housing within which are multiple layers of electrodes, separated by an ion-permeable material, and with the multiple layers of electrodes coupled to electrically and thermally conductive electrical terminals which extend beyond the cell housing to provide external electrical connections.

The typical design of a pouch cell is rectangular, with a long and short edge, with the two electrical terminals typically extending both along the same short edge, or alternatively with one at either short edge of the pouch cell. In a set of embodiments the positive electrical terminal extends along one long edge of the cell and the negative electrical terminal extends along the opposite long edge of the cell, with both electrical terminals extending away from the cell. Having the electrical terminals on the long edge is advantageous as it reduces the thermal conduction path length of the cell. This also increases the electrical terminal area, therefore improving the electrical and thermal contact with the heat sink and external electrical connections.

The electrical collectors and associated electrical terminals may be formed from any suitable electrically and thermally conductive material, but in a set of embodiments one set of electrical collectors—the negative electrical collectors—and the corresponding electrical terminal are fabricated from copper and the other set of electrical collectors—the positive electrical collectors—and corresponding electrical terminal are fabricated from aluminium. Both these materials possess high electrical and thermal conductivity.

In a set of embodiments, the electrode separation layer(s) in the cell are fabricated from a porous material. The electrode separation layer may be made from polyethylene or polypropylene. The electrode separation layer is porous such that the electrolyte which surrounds the electrodes is in contact with both electrodes through the separation layer, to allow the transport of ions.

The cell housing may be formed from any suitable material, but in a set of embodiments it is fabricated from an aluminium-polymer composite. This material has a high flexibility, as well as providing a good moisture barrier and pouch sealing characteristics to prevent leaking of the internal electrolyte.

The Applicant has appreciated that some implementations of the battery cooling systems described above may have a large number of connections between heatsink bars, which may make it more difficult to prevent fluid leakage. Furthermore, the Applicant has appreciated further ways in which overall weight may be reduced.

In a set of embodiments, the heat sink arrangement comprises a plurality of heat collectors disposed in the respective elongate channels and thermally coupled to at least one of said sidewalls of the elongate channels, wherein the heat collectors are thermally coupled to a common discrete heat removal portion.

It will be appreciated that in accordance with the embodiments described above, using heat collectors and a common discrete heat removal portion may reduce the risk of coolant fluid leakage compared to arrangements requiring sealing between multiple heat sink bars that pass coolant fluid. Reducing the number of components and the amount of sealing required may also improve the ease of manufacture and weight of the system. Also in arrangements in accordance with the embodiments outlined above, the temperature gradient between cells and across the electrical terminals may be reduced, as a common discrete heat removal portion may act to cool all of the plurality of cells equally. The heat removal portion(s) may be positioned away from the cells to reduce the risks associated with coolant leakage, if the heat sink uses an internal coolant fluid to conduct heat away from the electrical terminals.

In a set of embodiments, the common discrete heat removal portion comprises a conduit with an outer casing housing an internal coolant fluid which in use flows into the conduit via an inlet and out of the conduit via an outlet, wherein an external heat transfer system is arranged to pump the coolant fluid through the heat removal portion and to remove heat from the coolant fluid. As in the embodiments previously described, the outer casing may be electrically and thermally conductive, and the coolant fluid may be either a liquid or a gas. The coolant fluid may be electrically conductive; it may also be electrically insulating or a dielectric.

Alternatively, in a set of embodiments, the heat removal portion comprises a finned, ridged or other structure having multiple portions for increasing a surface-area thereof, which is in use exposed to airflow. Using such an increased-surface area structure as the heat removal portion may further reduce the overall system mass, as well as reducing the risk of leakage, as the use of coolant fluid to cool the cells may be avoided completely. There may also be a reduced part count, and no requirement to connect to an external heat transfer system to remove heat from the system.

In a set of embodiments, the heat collectors are arranged to provide an electrical connection between adjacent cells. In such a set of embodiments, there may be no electrically insulating, thermally conductive layer provided between the electrical terminals and the heat collectors of the heat sink arrangement. This may further improve the efficiency of thermal conduction between the electrical terminals and heat collectors by reducing the resistance to the conduction of the heat between the electrical terminals and the heat collectors.

In a set of embodiments, the heat collectors are arranged such that each heat collector extends across the width of the corresponding elongate channel and is thermally coupled to both sidewalls—i.e. to the two adjacent electrical terminals. The heat concentrator may be manufactured from a high conductivity material, such as copper, a heat-pipe, or a combination of the two. A heat pipe typically comprises an outer casing which houses a working fluid, and a wick structure, wherein the wick structure is arranged to generate capillary pressure and to transport the working fluid along the pipe to the outer casing portion which is thermally coupled to the sidewall. Heat pipes may improve the efficiency of cooling the terminals through improving the conduction of the heat between the electrical terminals and the heat removal portion.

The heat collectors may have any configuration, for example, they may be simple blocks coupled to the sidewalls of the elongate channels.

Alternatively, the heat collectors may be designed such that they minimise temperature gradients across each electrical terminal. For example, if heat is collected along the width of each electrical terminal, the heat collectors may be designed such that they are more conductive towards the heat removal portion, to counteract the accumulation of heat towards the heat removal portion away from the electrical terminals. A possible design of the heat collectors to reduce the heat resistance and therefore improve the thermal conductivity would be to increase the thickness of the heat collectors.

The common heat removal portion may be arranged within one or more of the elongate channels, with the heat collectors extending between and over the elongate channels. Such an arrangement may result in heat flowing towards a distal edge of each electrical terminal, with the heat from multiple cells concentrated by the common heat removal portion(s). Such an arrangement may reduce the conduction path length, helping to improve cooling, and may provide more even temperature across the width of the electrical terminals due to the reduced distance the heat is conducted along the terminals. In such an arrangement, the heat collectors may also provide the electrical connection between the cells. Further to this, the position of the heat collectors coupled to the electrical terminals extending from one end of the cells may be offset from the position of the heat collectors coupled to the electrical terminals extending from the opposite end of the cells. Such an offset arrangement would result in a series connection between the cells. The common heat removal portion may be arranged above the one or more elongate channels, with the common heat removal portion thermally coupled to the heat collectors extending within the elongate channels.

In a set of embodiments, the electrical terminals for a given cell are split into two or more portions across the width of the cell, such that two or more positive and two or more negative electrical terminals extend from each cell and an electrical terminal gap is formed between the electrical terminals of each cell. It will be appreciated by the skilled person that the electrical terminal gap is different to the elongate channel formed between adjacent pairs of electrical terminals. In particular, the electrical terminal gap would typically be arranged orthogonal to the elongate channels.

In such a set of embodiments, a common discrete heat removal portion is arranged within the electrical terminal gap. The common discrete heat removal portion would therefore be arranged orthogonal to the width of the electrical terminals. Such an arrangement may further reduce the conduction path length, as heat need only be conducted along the width of the split electrical terminals. For example, if the electrical terminals for all cells are split into two, the conduction path length will be at least halved compared to a continuous terminal width, further reducing thermal gradients across the electrical terminals.

The cooling system may be arranged with one common heat removal portion within the electrical terminal gap. In such an embodiment, the heat collectors may conduct heat along the width of the electrical terminals towards a central electrical terminal gap. Additionally or alternatively heat removal portions may be provided at the outer edges of the electrical terminals.

In embodiments with a heat removal portion within the electrical terminal gap, the heat removal portion may be shared between multiple groups of cells, with additional batteries stacked above and below the plurality of cells referred to herein, such that the common heat removal portion provides cooling to multiple batteries as it is shared between them.

Features of any aspect or embodiment described herein may, wherever appropriate, be applied to any other aspect or embodiment described herein. Where reference is made to different embodiments, it should be understood that these are not necessarily distinct but may overlap.

BRIEF DESCRIPTION OF THE DRAWINGS

Certain embodiments of the invention will now be described, by way of example only, with reference to the accompanying drawings in which:

FIG. 3 is an end view of the system of FIG. 1;

FIG. 4 is an enlarged cross-sectional end view;

FIG. 5 is an enlarged cross-sectional side view;

FIG. 6A is a schematic plan view of the integrated battery and cooling system of FIG. 1 with a parallel coolant flow configuration;

FIG. 6B is a view similar to FIG. 6A showing an alternative series coolant flow configuration;

FIG. 6C is a view similar to FIG. 6A showing a further alternative parallel-return coolant flow configuration;

FIG. 10A shows an integrated battery and cooling system in accordance with a further embodiment of the invention;

FIG. 10B is a side view of the system of FIG. 10A;

FIG. 10C is a plan view of the system of FIG. 10A;

FIG. 11A shows an integrated battery and cooling system with split tabs in accordance with a further embodiment of the invention;

FIG. 11B is a side view of the system of FIG. 11A;

FIG. 11C is a plan view of the system of FIG. 11A;

FIG. 13A shows an integrated battery and cooling system in accordance with a further embodiment of the invention;

FIG. 13B is an end view of the system of FIG. 13A;

FIG. 14A shows an integrated battery and cooling system in accordance with a further embodiment of the invention;

FIG. 14B is an end view of the system of FIG. 14A;

FIG. 15A shows an integrated battery and cooling system in accordance with a further embodiment of the invention;

FIG. 15B is a side view of the system of FIG. 15A;

FIG. 15C is a plan view of the system of FIG. 15A.

DETAILED DESCRIPTION

Figure 1:
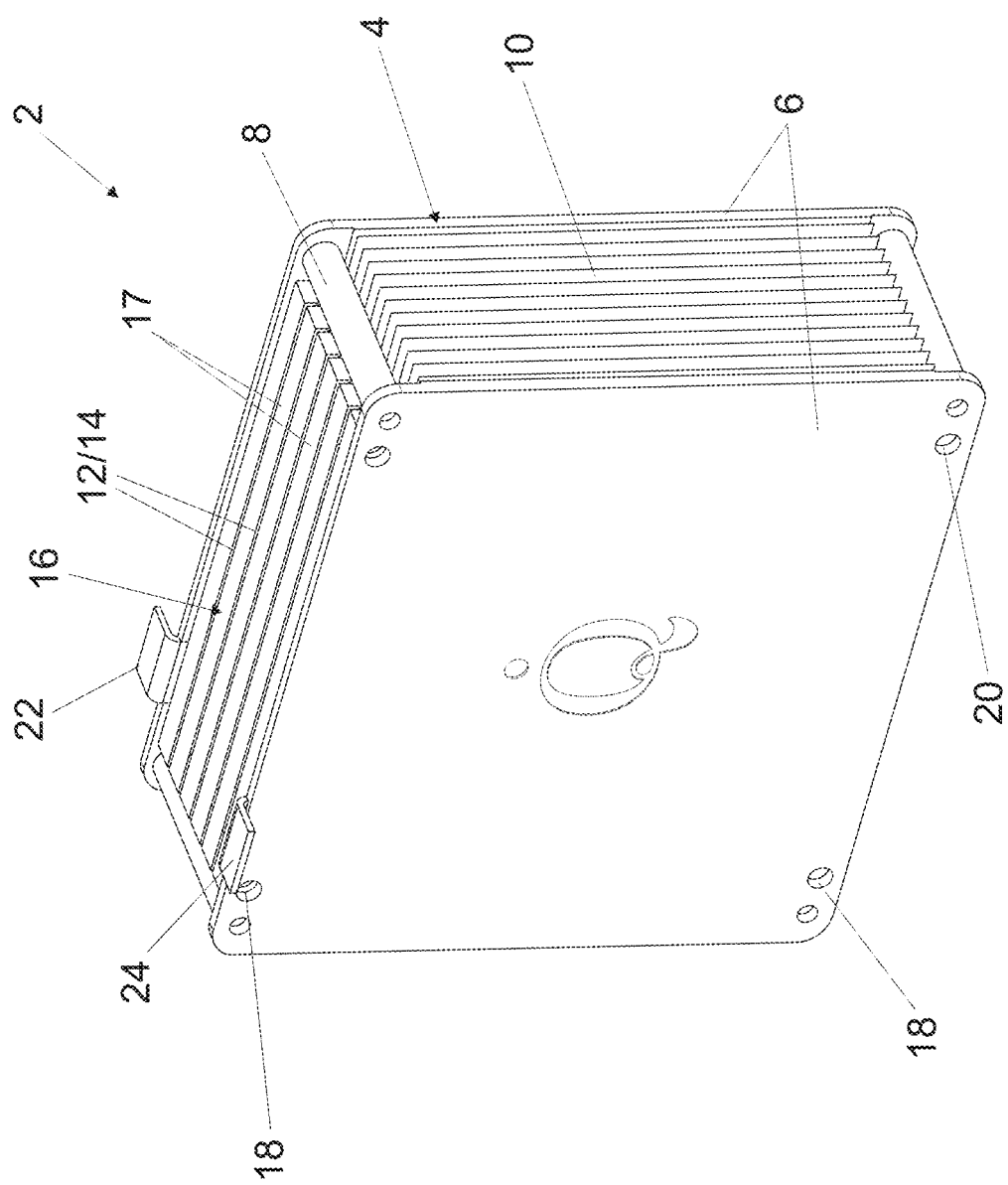
FIG. 1 shows an integrated battery and cooling system in accordance with an embodiment of the invention.
Figure 2:
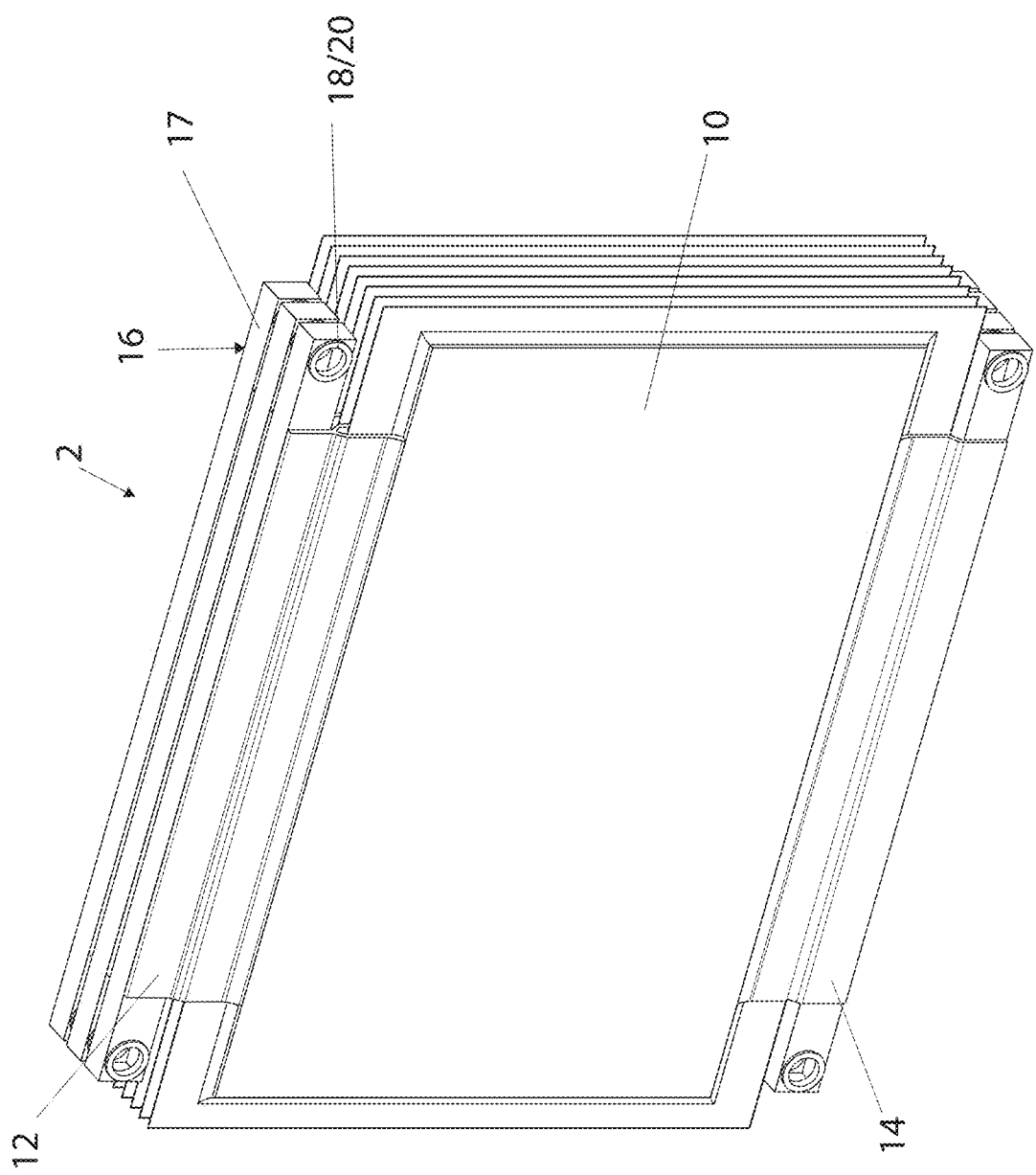
FIG. 2 is system of FIG. 1 with support structure removed.

FIGS. 1 to 4 show an integrated battery and cooling system 2 with a support structure 4 (omitted in FIG. 2) comprising end plates 6 and rigid spacers 8 which connect the two end plates 6. The integrated battery and cooling system 2 includes a plurality of electrical cells 10 with external electrical terminals (also known as tabs) extending from the covers of the respective cells which alternate between positive terminals 12 and negative terminals 14 from one cell to the next because the cells are alternately inverted. The electrical terminals 12, 14 are electrically and thermally conductive and are made from copper (negative terminal 14) and aluminium (positive terminal 12), as are the positive and negative electrical collectors 27 (see FIG. 4) within the electrical cell 10 to which they are connected. Therefore the electrical terminals 12, 14 conduct both current and heat out of the electrical cells 10 via the electrical collectors.

The external support structure 4 provides lateral compression to the plurality of cells 10 such that they do not delaminate.

As can be seen more clearly in FIG. 4, the terminals are bent towards one another so that their planar distal portions are connected in series such that the positive terminal 12 of one cell is connected to the negative terminal 14 of the adjacent cell 10. The end-most negative terminal 14 is connected to an external negative connector 22 and the end-most positive terminal 12 is connected to an external positive connector 24.

Since adjacent pairs of positive 12 and negative 14 electrical terminals are in contact, the electrical cells 10 are connected in series. The external electrical connections 22, 24 are then electrically coupled to the outermost electrical terminals 12, 14 of the plurality of cells 10 to provide external power. For example, if each electrical cell 10 provides a voltage of 3.7 V, across the twelve electrical cells 10 of FIG. 1 a voltage of ~44.4 V is produced between the external electrical connectors 22, 24.

The connected planar distal portions of the electrical terminals 12, 14 form sidewalls of a series of elongate channels within which a heat sink arrangement 16 is disposed. The heat sink arrangement 16 comprises a series of rectangular bars 17 which are connected to each other at their ends by means of inlet and outlet openings 18, 20 to enable a coolant fluid to flow between them. Each heat sink bar 17 is thermally coupled—e.g. by means of a thermally conducting pad—to the electrical terminals 12, 14 which separate it from the adjacent bar 17. The heat sink bars 17 allow an external coolant fluid to flow through the heat sink arrangement 16. The external electrical connections 22, 24 are electrically coupled to the outermost electrical terminals 12, 14 of the plurality of electrical cells 10 and extend beyond the respective end plates 6.

FIG. 4 shows an enlarged cross-sectional end view of the integrated battery and cooling system of previous Figures. Between each cell 10 there is a compressible layer 26 (e.g. foam). The compressible layer 26 enables the lateral expansion of the plurality of cells 10. When electrical cells 10 charge and discharge, they expand and the compressible layer 26 allows this expansion to occur whilst still allowing the external support structure 4 to provide rigidity such that the cells 10 remain planar.

Within each cell is a plurality of positive and negative electrical collectors 27 which are connected to the positive 12 and negative 14 electrical terminals respectively which extend beyond the cell housing. Between the pairs of adjacent electrical terminals 12, 14 and the heat sink bars 17 can be seen an electrically insulating layer 28. The insulating layer 28 between the electrical terminals 12, 14 and the heat sink arrangement 16 is a thin layer of material e.g. a thermally conductive pad which is electrically insulating but thermally conductive. The interface layer 28 therefore electrically isolates adjacent pairs of electrical terminals 12, 14 from the heat sink arrangement 16 and the next adjacent pair of electrical terminals 12, 14 in order to connect the plurality of cells 10 in series.

Each of the heat sink bars 17 comprises an outer casing 30 which defines an interior cooling channel 32. In use a coolant fluid flows within the interior cooling channel 32.

FIG. 5 shows an enlarged cross-sectional side view through one of the heat sink bars 17. From this can be seen an array of pedestals 34 distributed across the interior space 32. The heat sink bar 17 has an inlet 18 and outlet 20. In use coolant fluid enters the interior cooling channel 32 of the heat sink bar 17 via the opening 18. The coolant fluid then flows through the interior channel 32, around the flow modifying pedestals 34. The coolant fluid then leaves through the outlet opening 20.

FIGS. 6A, 6B, 6C show schematically parallel, series, and parallel return coolant flow configurations respectively.

In the parallel configuration shown in FIG. 6A, the inlet 18 and outlet 20 are at opposite ends of the respective heat sink bars 17. The coolant fluid 36 enters the heat sink arrangement 16 at the inlet 18a of the leftmost bar 17a and then passes in turn into the inlets 18 of all the other bars 17. The coolant fluid 36 is thus distributed between each bar 17 of the heat sink arrangement 16 so that it flows along the length of each heat sink bar 17 to the corresponding outlets 20 where it recombines and flows out of the outlet 20b of the right-most bar 17b.

In use of the system described above, heat is generated inside each cell 10 which is conducted by the individual electrical collectors 27 to the corresponding terminals 12, 14. The close thermal coupling between planar portions of the terminals 12, 14 and the casing 30 if the heat sink bars 17 allows an efficient transfer of heat across the casing and to the coolant fluid 36 flowing within them, enhanced by the increased surface area and turbulent flow caused by the internal array of pedestals. The coolant fluid 36 carries the heat out of the heat sink arrangement 16 to an external system where it can be effectively dissipated before the coolant fluid is returned around the circuit. The parallel flow provided by this arrangement ensures as even a temperature distribution as possible across the battery.

The coolant fluid 36 flows into the heat sink arrangement 16 through the inlet 18 in response to a signal from an external temperature monitor indicating that the cells 10 need to be cooled to maintain optimum function and prevent degeneration. The coolant fluid 36 then leaves the heat sink arrangement 16 through the outlet 20 to the external heat transfer system. The external heat transfer system propels the coolant fluid 36 into the inlet opening 18 of the heat sink arrangement 16 and extracts heat energy from the coolant fluid 36 which has passed through the heat sink arrangement 16 to cool the coolant fluid 36. The external heat transfer system can therefore adjust the degree of cooling according to external temperature, the temperature of the battery and the optimum temperature of operation.

The amount of heat produced by the electrical cells 10 is determined by their application, such as powering EVs. Depending on the circumstances, the ideal operating temperature of the electrical cells 10 will be determined by an external processor in order to optimise their function. The battery cooling system 2 therefore additionally comprises a feedback mechanism which measures the temperature of the electrical cells 10 and uses this temperature in order to determine the degree of cooling which needs to be provided by the heat sink arrangement 16 in order to allow the electrical cells 10 to function optimally.

In FIG. 6B an alternative heat sink arrangement 116 having an alternative coolant flow configuration is shown. In this arrangement, the inlets 118 of all heat sink bars 117 (except the first bar 117a) are connected to the outlets 120 of the previous bar to give a serpentine configuration. The coolant fluid 36 enters the heat sink arrangement 116 at the inlet 118a of the left-most bar 117a and flows along the length thereof where it then passes from its outlet into the inlet of the next heat sink bar 117 and flows through this next heat sink bar 117 in the opposite direction. The coolant 36 follows this flow path until it leaves the heat sink arrangement 116 via the outlet 120b of the right-most bar 117b. This is therefore a series coolant flow configuration.

In FIG. 6C, the inlets 218 and outlets 220 on the same ends of the respective heat sink bars 217 are used with the internal channels thereof being divided into two contra-flow portions joined at the far end. The coolant fluid 36 flows into the inlet 218 of the left-most heat sink bar 217a. This coolant fluid 36 is then distributed between each of the heat sink bars 217. The coolant fluid 36 then flows along the length of the each bar 217 to the far end and then back in the opposite direction to a manifold where the returning coolant fluid is collected and flows out of the heat sink arrangement 216 via the right-most outlet 220b. This is a parallel return coolant flow configuration.

The series flow configuration of FIG. 6B enables ease of manufacture as having the overall inlet 118a and outlet 120b on the same end of the heat sink arrangement 116 enables an external heat transfer system to be attached with more ease than the parallel flow configuration. However, the series flow arrangement may not be able to maintain such a homogenous temperature across the plurality of cells 10 as the parallel arrangement of FIG. 6A since cells closer to the main inlet 118a will be cooled more than those closer to the main outlet 120b. The parallel return configuration of FIG. 6C combines the benefits of both the parallel and series flow configurations in ease of manufacture and maintaining a homogenous temperature.

Another embodiment of the invention will now be described with reference to FIGS. 7 to 9.

Figure 7:
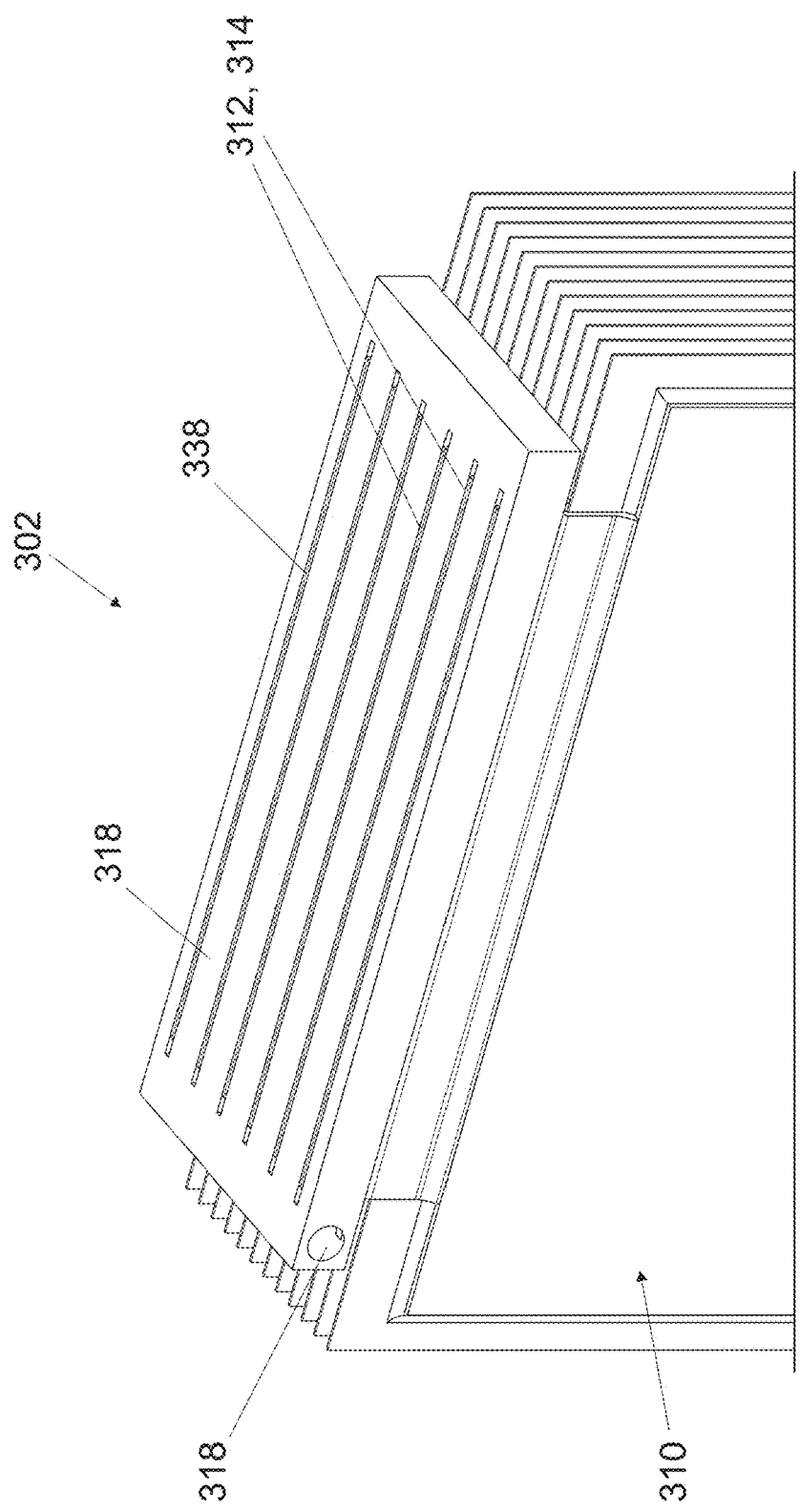
FIG. 7 is a perspective view of another embodiment of with a single block heat sink arrangement.
Figure 7:
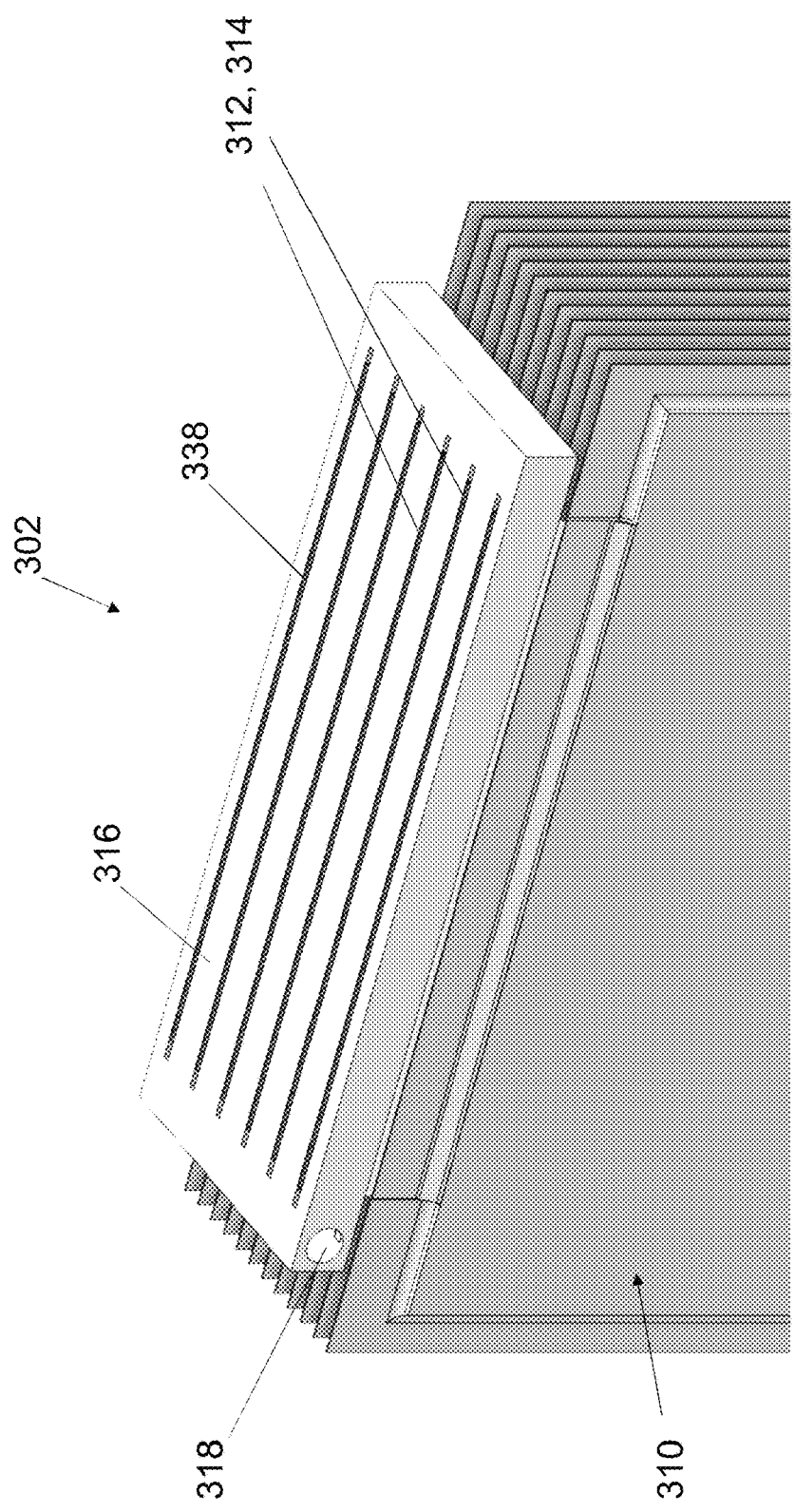

FIG. 7 is a perspective view of another embodiment of the invention comprising a 'single block' heat sink arrangement 316. As previously, the system 302 includes a plurality of electrical cells 310 with positive and negative electrical terminals 312, 314. The electrical terminals 312, 314 form sidewalls of a series of elongate channels which receive respective portions of the heat sink arrangement 316 which has a series of parallel slots 338 within which the electrical terminals 312, 314 fit, to allow this. The heat sink arrangement 316 therefore extends around the electrical terminals 312, 314. The coolant inlet 318 can also be seen.

Figure 8:
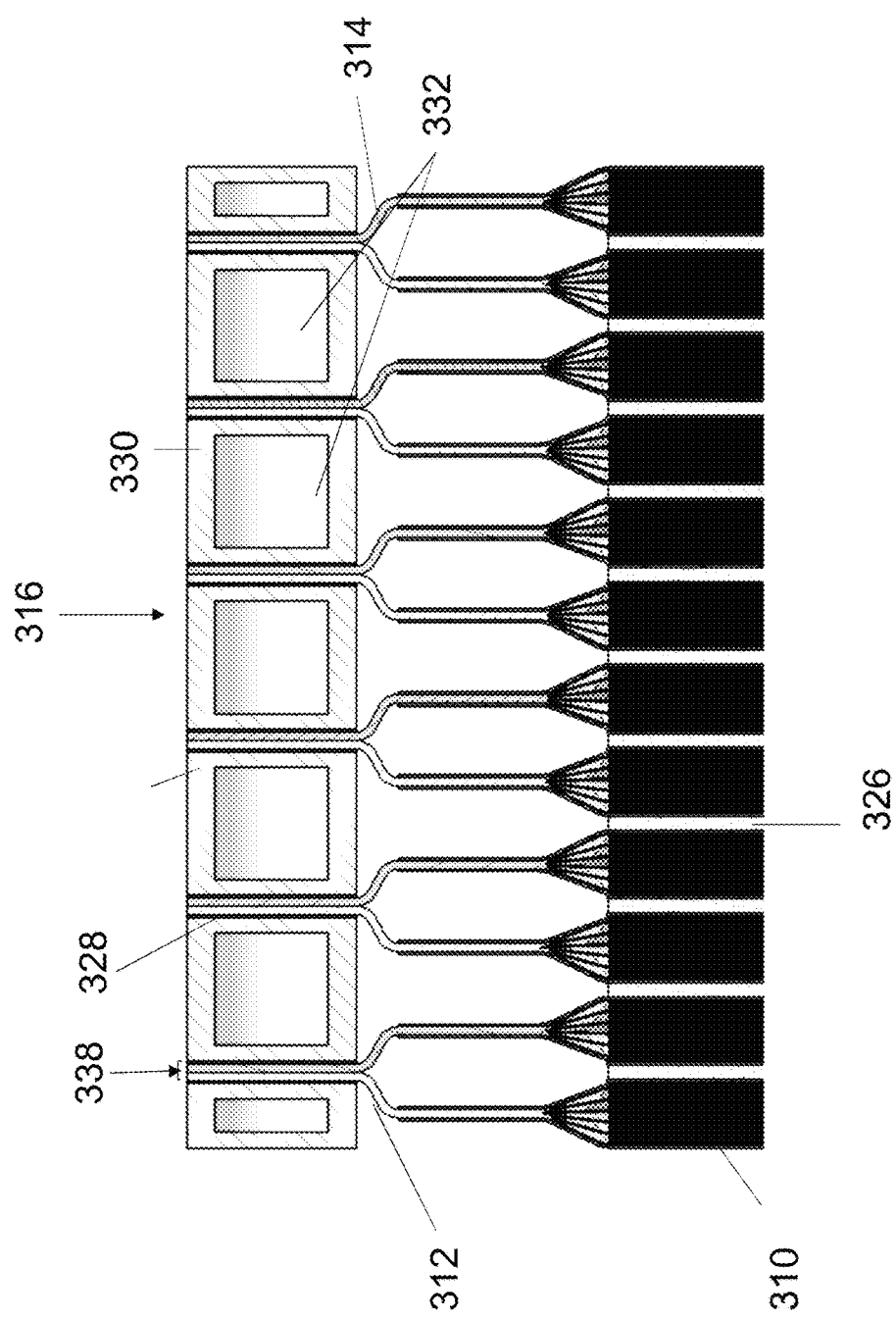
FIG. 8 is an enlarged cross-sectional end view of the embodiment of FIG. 7.

FIG. 8 is an enlarged cross-sectional end view of the battery cooling system of FIG. 7. As in previous embodiments a compressible layer is provided 326 between each of the electrical cells 310. Adjacent pairs of electrical terminals 312, 314 extend away from the cell housing and bend so they are in electrical and thermal contact with the adjacent electrical terminal 312, 314. Each of these pairs of adjacent electrical terminals 312, 314 then fit within the slots 338 with an electrically insulating layer 328 between them and the outer casing 330 of the heat sink arrangement 316. The outer casing 330 defines interior cooling channels 332 between the slits. Within the cooling channels 332 may be provided flow modifying pedestals (not shown).

Figure 9:
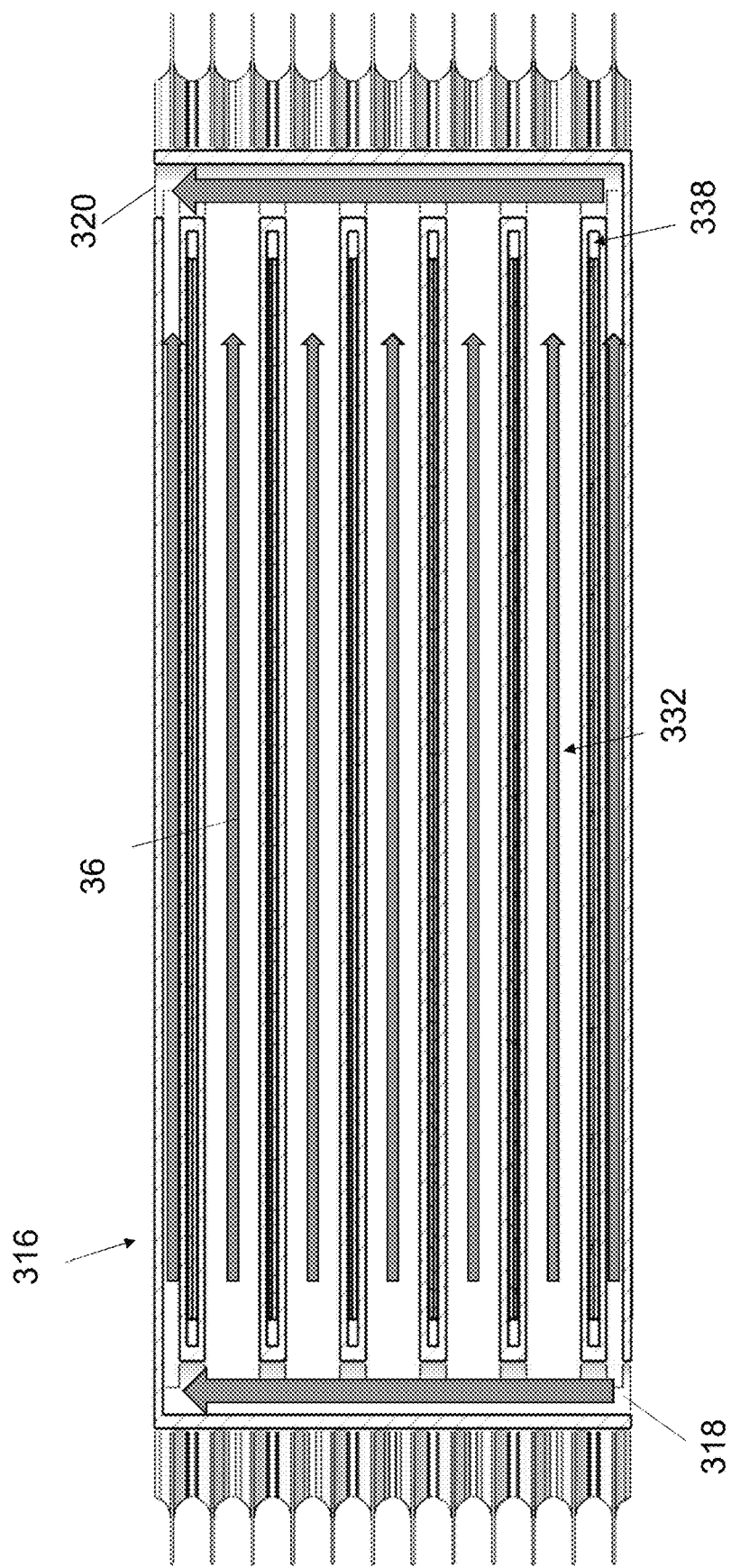
FIG. 9 is a schematic view of the coolant flow configuration of the embodiment of FIG. 7

FIG. 9 shows a plan view of the cooling system of FIG. 7 showing a parallel coolant flow configuration. The inlet 318 and outlet 320 are on opposite sides of the heat sink arrangement 316. The coolant fluid 36 flows into the inlet 318 and is then distributed between each of the cooling channels 332 by means of an internal manifold. The coolant fluid 36 flows along each of the cooling channels 332 to where the cooling channels 332 recombine on another internal manifold and the coolant fluid 36 flows out of the outlet 320.

Of course other coolant flow configurations are possible—e.g. those discussed above.

In order to secure the adjacent pairs of electrical terminals 312, 314 into the slots 338, various methods such as thermal shrink fitting, flexible pads, pressure fitting etc. may be used to ensure a tight fit.

Similarly to the heat sink bars 17 of FIG. 1, the block heat sink arrangement 316 is cooled due to the coolant fluid 36 which flows through the cooling channels 332, conducting heat away from the electrical terminals 312, 314 and therefore the cells 310 where it is expelled using an external heat transfer system.

FIGS. 10A-C show an integrated battery and cooling system 402 in accordance with a further embodiment of the invention with a heat sink arrangement 416 comprising a plurality of heat collectors 440 and common heat removal portion in the form of heat sink bars 417. As in previous embodiments, the system 402 includes a plurality of electrical cells 410 with positive and negative electrical terminals 412, 414 forming sidewalls of a series of elongate channels which receive respective heat collectors 440 thermally coupled to each of the opposed sidewalls of the elongate channels. The heat sink bars 417 are thermally coupled to and extend transversely across the ends of the heat collectors 440 such that the heat sink bars 417 are disposed at the ends of the elongate channels. Four such heat sink bars 417 are shown in FIGS. 10A and 10B—one at either end of the electrically conductive tabs 412, 414, and at the top and bottom of the cells 410. The heat from multiple electrical terminals 412, 414 is therefore concentrated into a reduced number of heatsinks 417 compared to previous embodiments.

As in previous embodiments, the heat sink bars 417 have an outer casing 430 which defines an interior cooling channel 432 through which an internal coolant fluid may flow. Within the cooling channels 432, flow modifying pedestals may be provided (not shown). The heat sink bars 417 may each have an inlet and outlet to enable the coolant fluid to flow therethrough. The heat sink bars 417 may be further connected to an external heat transfer system (not shown) which dissipates the heat from the coolant fluid. Alternatively, the common heat removal portion may be a finned structure which is exposed to airflow in order to dissipate heat.

The plurality of heat collectors 440 are highly thermally conductive and act to draw heat away from the electrical terminals 412, 414 towards the heat sinks 417. The heat collectors 440 may be manufactured from a high-conductivity material such as copper, a heat-pipe, or a combination of these. It is well understood by the skilled person that a heat pipe comprises an outer casing housing a working fluid, with an internal wick structure arranged to generate capillary pressure and transport the working fluid along the pipe. The heat is therefore collected along the width of the heat concentrators 440 towards the heat sink bars 417 which are disposed at the ends of the elongate channels.

Such a design reduces the weight of the cooling system, as well as the associated risks of leakage in the aforementioned embodiments, due to the reduction in the number of heatsinks, and connections between the heatsinks, all of which increase the possibility of coolant fluid leakage. Minimising the weight of a cooling system for batteries is particularly advantageous for batteries which power EVs, where reduction in weight leads to improve performance.

The heat concentrators 440 may have any design and shape, however in FIGS. 10A-10C they have a segmented structure in order to maintain the temperature along the electrical terminals 412, 414 as uniform as possible, with the heat collectors 440 being thicker towards the ends which are in thermal contact with the heat sinks 417 and thinner in the centre. The thicker regions of the heat collectors 440 have less thermal resistance which also provides improved heat transfer to the heat sinks 417. As heat is accumulated along the width of the terminals 412, 414 to the heatsinks 417, the variation in thickness of the heat collectors 440 helps maintain uniform electrical terminal 412, 414 temperature. Other heat collector geometries are possible in order to obtain uniform temperature across the electrical terminals 412, 414.

FIGS. 11A-C show an integrated battery and cooling system 502 in accordance with a further embodiment of the invention with electrical terminals 512, 514 which are split width-wise. The battery comprises a plurality of cells 510. External electrical terminals extend from the covers of the respective cells which alternate between positive terminals 512 and negative terminals 514 from one cell to the next because the cells are alternately inverted. The electrical terminals 512, 514 are electrically and thermally conductive and as in previous embodiments are made from copper (negative terminal 514) and aluminium (positive terminal 512). Therefore the electrical terminals 512, 514 conduct both current and heat out of the electrical cells 510 via the electrical collectors. The electrical terminals 512, 514 are split in two such that two separate positive terminals 512, and two separate negative terminals 514 extend from each of the cells 510. As such, an electrical terminal gap is formed between the pairs of terminals 512, 514, and a common heat removal portion which comprises a central heat sink bar 517a is disposed within this electrical terminal gap.

The terminals 512, 514 are bent towards one another so that their planar distal portions are connected in series such that the positive terminal 512 of one cell is connected to the negative terminal 514 of the adjacent cell 10. Since adjacent pairs of positive 512 and negative 514 electrical terminals are in contact, the electrical cells 510 are connected in series despite the electrical terminals 512, 514 being split into two. The split terminals 512, 514 also reduce the weight of the battery.

As in previous embodiments the electrical terminals 512, 514 form sidewalls of a series of elongate channels which are orthogonal to the electrical terminal gap, and the elongate channels receive respective heat collectors 540 which are thermally coupled to each of the opposed sidewalls of the elongate channels. Further heat sink bars 517b, 517c are thermally coupled to the outer ends of the heat collectors 540 such that heat sink bars 517b, 517c are disposed at the ends of the elongate channels, as well as the central one 517a between the split terminals 512, 514.

The heat sink bars 517a-c may be constructed and connected the same way as in previous embodiments, As in the embodiment of FIG. 10, the heat collectors 540 have a segmented structure in order to maintain the temperature along the electrical terminals 512, 514 as uniform as possible, with the heat collectors 540 being thicker towards their ends which are in thermal contact with the heat sinks 517a-c and thinner in the centre. In this embodiment, as the electrical terminals 512, 514 are split in two, they are shorter, which makes it easier to minimise any temperature gradient across them compared to the longer terminals 412, 414 of FIG. 10.

Figure 12B:
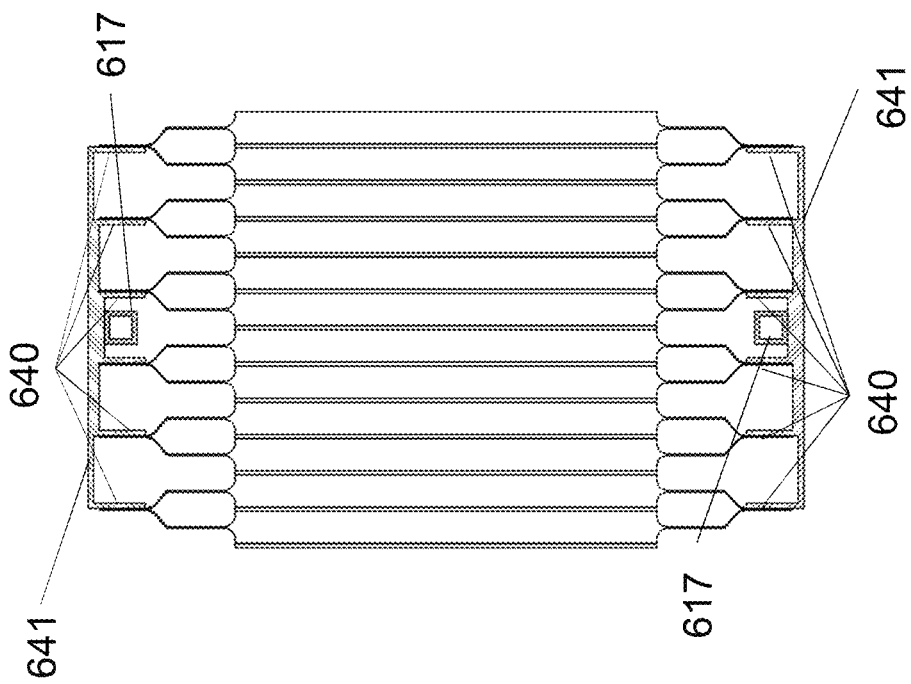
FIG. 12B is an end view of the system of FIG. 12A.
Figure 12A:
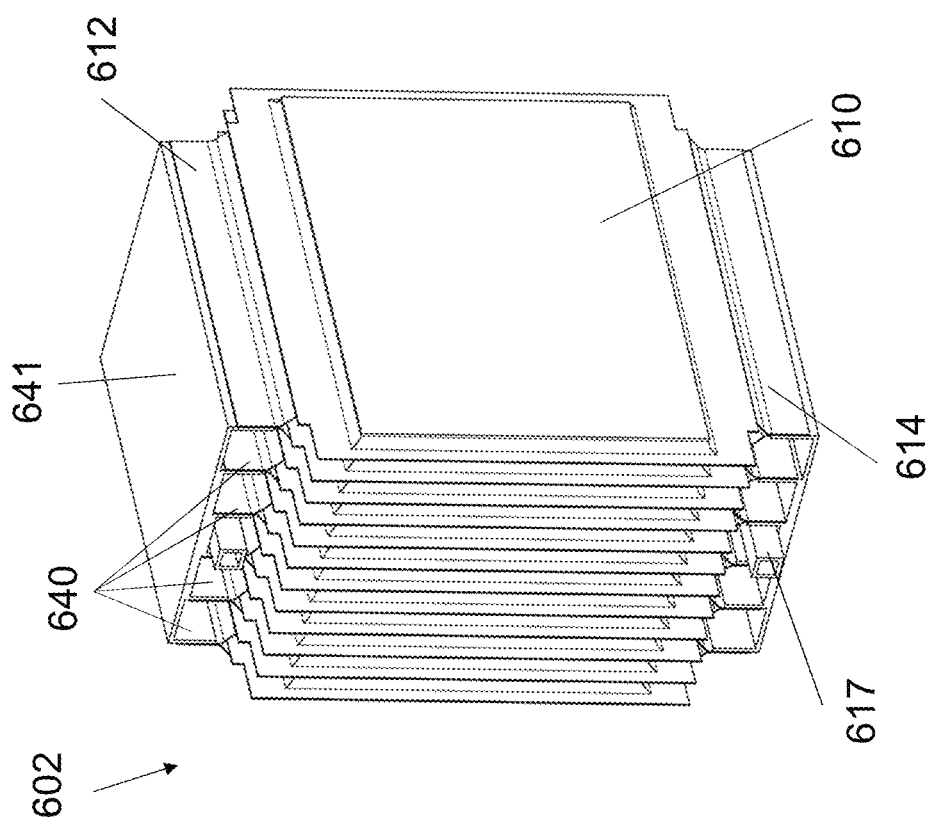
FIG. 12A shows an integrated battery and cooling system in accordance with a further embodiment of the invention.

FIGS. 12A-B show an integrated battery and cooling system 602 617 in accordance with a further embodiment of the invention comprising a plurality of heat collectors 640 and a common heat removal portion in the form of a heat sink bar 617. As in previous embodiments, the system 602 includes a plurality of electrical cells 610 with positive and negative electrical terminals 612, 614. The electrical terminals 612, 614 form sidewalls of a series of elongate channels which receive respective heat collectors 640. These take the form of a series of orthogonal flanges 640 which extend from respective end blocks 641a, 641b at the top and bottom of the stack. The flanges 640 are thermally coupled to each of the opposed sidewalls of the elongate channels. The end blocks 641 extend over the respective electrical terminals 612, 614 and, for reasons similar to those outlined in respective of the embodiments of FIGS. 10C and 11C, the block is made thicker in the centre than at the edges. A heat sink bar 617 is disposed in the central elongate channel of the battery and is thermally coupled to the thicker central portion of the end block 641. The heat from the electrical terminals 612, 614 is therefore collected by the heat collectors 640 and transferred via the transverse portion of the end block 641 to the heat sink 617 which conducts the heat away from the plurality of cells 610.

As only one heat sink bar 617 on each of the top and bottom of the stack is used for cooling in this embodiment, the weight of the system 602 can be reduced compared to previous embodiments. The heat is conducted along the lengths of the electrical terminals 612, 614 (in the direction towards their distal edges) to the heat concentrator 617, rather than across their widths, and as such, the conduction path is much shorter, which further reduces temperature gradients within the electrical terminals 512, 514.

FIGS. 13A and 13B show an integrated battery and cooling system 702 in accordance with a further embodiment of the invention. The system comprises a plurality of electrical cells 710 with positive and negative electrical terminals 712, 714. A plurality of heat collectors 740 and a common heat removal portion which comprises heat sink bars 717 provide the cooling system. The electrical terminals 712, 714 form sidewalls of a series of elongate channels which receive respective heat collectors 740, which like the previous embodiment are in the form or protruding flanges from a series of smaller end block 741 and are thermally coupled to each of the opposed sidewalls. As in the previous embodiments the flanges 740 extend up to the end block 741 which extends over the electrical terminals 712, 714 such that groups of heat collectors 740 are connected to one another. One heat sink bars 717 is provided for each group in the centre thereof. The heat from the electrical terminals 712, 714 is therefore collected by the heat collectors 740 and conducted via the end blocks 741 to the heat sink bars 717 which conduct the heat away from the plurality of cells 710. As in the previous embodiment, this configuration of the heat collectors 740 and heat sink bars 717 reduces the conduction path for the heat, as it is conducted along the length of the electrical terminals 712, 714, therefore reducing any temperature gradients within the electrical terminals 712, 714.

The heat collectors 740 in this embodiment may also be used to provide the electrical connection between adjacent cells 710. It will be appreciated that the heat collectors 740 coupled to the electrical terminals 712, 714 extending from one end of the cells 710 are offset from the heat collectors 740 coupled to the electrical terminals 712, 714 extending from the other end of the cells 710. This offset heat concentrator arrangement may be used to provide a series connection between the plurality of cells 710.

FIGS. 14A and 14B show an integrated battery and cooling system 802 in accordance with a further embodiment of the invention. Similarly to the embodiments of FIGS. 12 and 13, the system 802 comprises a plurality of electrical cells 810 with positive and negative electrical terminals 812, 814. A plurality of heat collectors 840 and a common heat removal portion which comprises heat sink bars 817 provide the cooling system. The electrical terminals 812, 814 form sidewalls of a series of elongate channels which receive respective heat collectors 840 which like the previous embodiment are in the form or protruding flanges from a series of smaller end blocks 841 and are thermally coupled to each of the opposed sidewalls. As in the previous embodiments, the flanges 840 extend up to the end blocks 841 which extends over the electrical terminals 812, 814 such that groups of heat collectors 840 are connected to one another. In this embodiment, heat sink bars 817 are provided between the end blocks 840. In this way, the heat from multiple cells 810 is collected by the heat collectors 840 and conducted via the end blocks 841 to the heat sink bars 817 which conduct the heat away from the plurality of cells.

FIGS. 15A-15C show an integrated battery and cooling system 902 with split electrical terminals in accordance with a further embodiment of the invention. As with all embodiments, the system 902 comprises a plurality of electrical cells 910. The terminals 912*a*, 914*a*, and 912*b*, 914*b* are bent towards one another so that their planar distal portion are connected in series such that the positive terminal 912*a* of one cell is connected to the negative terminal 914*a* of the adjacent cell 910. Since adjacent pairs of positive 912*a,b* and negative 914*a,b* electrical terminals are in contact, the electrical cells 910 are connected in series.

In this embodiment however, the electrical terminals 912*a*, 912*b*, 914*a*, 914*b* are split in two width-wise such that two separate positive terminals 912*a*, 912*b*, and two separate negative terminals 914*a*, 914*b* extend from each of the cells 910. As such, an electrical terminal gap is formed between the pairs of terminals 912*a*, 912*b*, and 914*a*, 914*b*.

The positive and negative electrical terminals 912*a*, 914*a*, and 912*b*, 914*b* form sidewalls of a series of elongate channels which receive respective heat collectors 940 thermally coupled to each of the opposed sidewalls of the elongate channels. Heat sink bars 917*a-d* are thermally coupled to and extend transversely across the length of each of the respective heat collectors 940 such that the heat sink bars are arranged above the heat collectors, parallel to the electrical terminal gap. Four such heat sink bars 917*a-d* are shown in FIGS. 15A-C, with each heat sink bar 917*a-d* acting to cool one set of the split electrical terminals 912*a*, 914*a*, and 912*b*, 914*b*, such that two heat sink bars 917*a*, 917*b* are coupled to one end of the cells 910, and the other heat sink bars 917*c*, 917*d* are coupled to the other end of the cells 910. The heat from multiple electrical terminals 912*a,b*, 914*a,b* is therefore concentrated into the heatsinks 917*a-d*.

The heat concentrators 940 are wedge-shaped, increasing in thickness towards the centre of the elongate channel, where the heat sink bars 917*a-d* are in thermal contact with the heat concentrators 940. The thicker regions of the heat collectors 940 have less thermal resistance which also provides improved heat transfer to the heat sinks 917*a-d*.

The heat sink bars 917*a-d* therefore act to cool all cells 910 within the battery system. In this embodiment, the heat sink bars 917*a-d* are closed channels with an internal coolant fluid flow to remove the heat collected by the heat collectors 940. The heat is therefore concentrated along the width of the electrical terminals 912*a,b*, 914*a,b* towards their centre.

It will be appreciated by those skilled in the art that the invention has been illustrated by describing one or more specific embodiments thereof, but is not limited to these embodiments; many variations and modifications are possible, within the scope of the accompanying claims. For example it is envisaged that the heat sink arrangement could extend over the ends of the electrical terminals which may further enhance heat transfer and distribution. The cells could also be electrically connected in parallel instead of in series to increase capacity without increasing the total voltage.

The invention claimed is:

1. An integrated battery and cooling system comprising a plurality of cells and a heat sink arrangement, wherein each cell comprises:

at least one electrical collector of a first material coupled to a first electrically and thermally conductive electrical terminal extending away therefrom, and at least one electrical collector of a second material coupled to a second electrically and thermally conductive electrical terminal extending away therefrom, wherein the electrical terminals are shaped so that they are bent in a proximal region such that they come into electrical and thermal contact with the adjacent electrical terminal to form a pair, wherein the pairs of adjacent electrical terminals are substantially planar in a distal region and form respective sidewalls of a series of elongate channels therebetween, and wherein the heat sink arrangement extends within each channel and is thermally coupled to at least one sidewall thereof.

2. The integrated battery and cooling system as claimed in claim 1 wherein the heat sink arrangement comprises a plurality of bars disposed in respective channels.

3. The integrated battery and cooling system as claimed in claim 2 wherein each bar of the heat sink arrangement comprises an outer casing housing an internal coolant fluid which in use flows into the bar via an inlet and out of the bar via an outlet.

4. The integrated battery and cooling system as claimed in claim 3 wherein the heat sink arrangement comprises cooling features within the outer casing disposed in a flow channel in which the coolant fluid can flow.

5. The integrated battery and cooling system as claimed in claim 2 wherein the plurality of bars of the heat sink arrangement are arranged such that each bar extends across a width of a corresponding elongate channel and is thermally coupled to both sidewalls.

6. The integrated battery and cooling system as claimed in claim 2 wherein each bar of the heat sink arrangement is connected to an adjacent bar via respective inlets and outlets to enable the flow of coolant fluid throughout the plurality of bars.

7. The integrated battery and cooling system as claimed in claim 1 wherein the heat sink arrangement comprises a block including slots receiving the electrical terminals, such that the heat sink arrangement extends within the elongate channels between the electrical terminals.

8. The integrated battery and cooling system as claimed in claim 7 wherein the block of the heat sink arrangement comprises an outer casing housing an internal coolant fluid which in use flows into the block via an inlet and out of the block via an outlet.

9. The integrated battery and cooling system as claimed in claim 8 wherein the heat sink arrangement comprises cooling features within the outer casing disposed in a flow channel in which the coolant fluid can flow.

10. The integrated battery and cooling system as claimed in claim 7 wherein the heat sink arrangement extends between the terminals in the channels therebetween, and over ends of the electrical terminals.

11. The integrated battery and cooling system as claimed in claim 1 wherein the electrical terminals for a given cell are split into two or more portions across the width of the cell, such that two or more positive and two or more negative electrical terminals extend from each cell and an electrical terminal gap is formed between the electrical terminals of each cell.

12. The integrated battery and cooling system as claimed in claim 1 wherein the heat sink arrangement comprises a plurality of heat collectors disposed in the respective elongate channels and thermally coupled to at least one of said sidewalls of the elongate channels, wherein the heat collectors are thermally coupled to a common discrete heat removal portion.

13. The integrated battery and cooling system as claimed in claim 12 wherein the common discrete heat removal portion comprises a conduit with an outer casing housing an internal coolant fluid which in use flows into the conduit via an inlet and out of the conduit via an outlet, wherein an external heat transfer system is arranged to pump the coolant fluid through the heat removal portion and to remove heat from the coolant fluid.

14. The integrated battery and cooling system as claimed in claim 12 wherein the heat removal portion comprises a finned, ridged or other structure having multiple portions for increasing a surface-area thereof, which is in use exposed to airflow.

15. The integrated battery and cooling system as claimed in claim 12 wherein the heat collectors are arranged such that each heat collector extends across the width of the corresponding elongate channel and is thermally coupled to both sidewalls.

16. The integrated battery and cooling system as claimed in claim 12 wherein the electrical terminals for a given cell are split into two or more portions across the width of the cell, such that two or more positive and two or more negative electrical terminals extend from each cell and an electrical terminal gap is formed between the electrical terminals of each cell and wherein the common discrete heat removal portion is arranged within the electrical terminal gap.

17. The integrated battery and cooling system as claimed in claim 12 wherein the heat collectors are arranged to provide an electrical connection between adjacent cells.

18. The integrated battery and cooling system as claimed in claim 17 wherein no electrically insulating, thermally conductive layer is provided between the electrical terminals and the heat collectors of the heat sink arrangement.

19. The integrated battery and cooling system as claimed in claim 1 comprising an external support structure encasing the integrated battery and cooling system.

20. The integrated battery and cooling system as claimed in claim 19 comprising a compressible layer between the outermost cells and the external support structure.

21. The integrated battery and cooling system as claimed in claim 1 comprising a compressible layer between adjacent cells.

22. The integrated battery and cooling system as claimed in claim 1 wherein adjacent pairs of electrical terminals are electrically coupled to connect the plurality of cells in series.

23. The integrated battery and cooling system as claimed in claim 1 comprising an electrically insulating, thermally conductive layer between the electrical terminals and the heat sink arrangement.

24. The integrated battery and cooling system as claimed in claim 1 wherein the cell is a rectangular pouch cell, with two long and two short edges and a positive electrical terminal extends along one long edge of the cell and a negative electrical terminal extends along the opposite long edge of the cell, with both electrical terminals extending away from the cell.

* * * * *